(12) United States Patent
Nozaki

(10) Patent No.: US 6,275,281 B1
(45) Date of Patent: Aug. 14, 2001

(54) IMAGE FORMING APPARATUS AND CONTROLLING METHOD THEREFOR

(75) Inventor: Tetsuya Nozaki, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/396,781

(22) Filed: Sep. 15, 1999

(30) Foreign Application Priority Data

Sep. 18, 1998 (JP) .................................. 10-263778
Sep. 18, 1998 (JP) .................................. 10-263781

(51) Int. Cl.$^7$ ........................... G03B 27/27; G03B 27/72; G03B 27/32; H04N 1/46
(52) U.S. Cl. ................................ 355/35; 355/69; 355/77; 355/79; 355/84; 355/88; 358/501; 358/515; 358/530
(58) Field of Search .................................. 355/35, 69, 77, 355/79, 84, 88; 358/501, 515, 530

(56) References Cited

U.S. PATENT DOCUMENTS

| | | | |
|---|---|---|---|
| 4,937,664 | * | 6/1990 | Chiku et al. ............................. 358/75 |
| 5,023,708 | * | 6/1991 | Maruyama et al. .................... 358/75 |
| 5,030,988 | * | 7/1991 | Haneda et al. ......................... 355/200 |
| 5,596,427 | * | 1/1997 | Honma et al. ......................... 358/515 |
| 5,734,484 | | 3/1998 | Yamamoto et al. .................. 358/500 |
| 5,764,380 | * | 6/1998 | Noguchi ................................ 358/488 |
| 5,854,958 | * | 12/1998 | Tanimoto et al. ...................... 399/49 |

* cited by examiner

Primary Examiner—Russell Adams
Assistant Examiner—Khaled Brown
(74) Attorney, Agent, or Firm—Fitzpatrick, Cella, Harper & Scinto

(57) ABSTRACT

The invention intends to match the image writing start positions for different color components, even in case of the rotation speed of the photosensitive member etc. fluctuates by the variation in the load or by the backlash of the driving gears.

For attaining this object, the invention is featured by a configuration of detecting and retaining the phase difference between the ITOP signal and the BD signal at a predetermined timing, also detecting the phase difference between the ITOP signal and the BD signal for each formation of the color component image, comparing the phase difference detected at the predetermined timing with that detected for each formation of the color component image, and controlling the timing of starting the image formation by changing, by an image writing tart timing control circuit, the number of BD signal to be counted after the generation of ITOP signal and before the start of image formation.

20 Claims, 21 Drawing Sheets

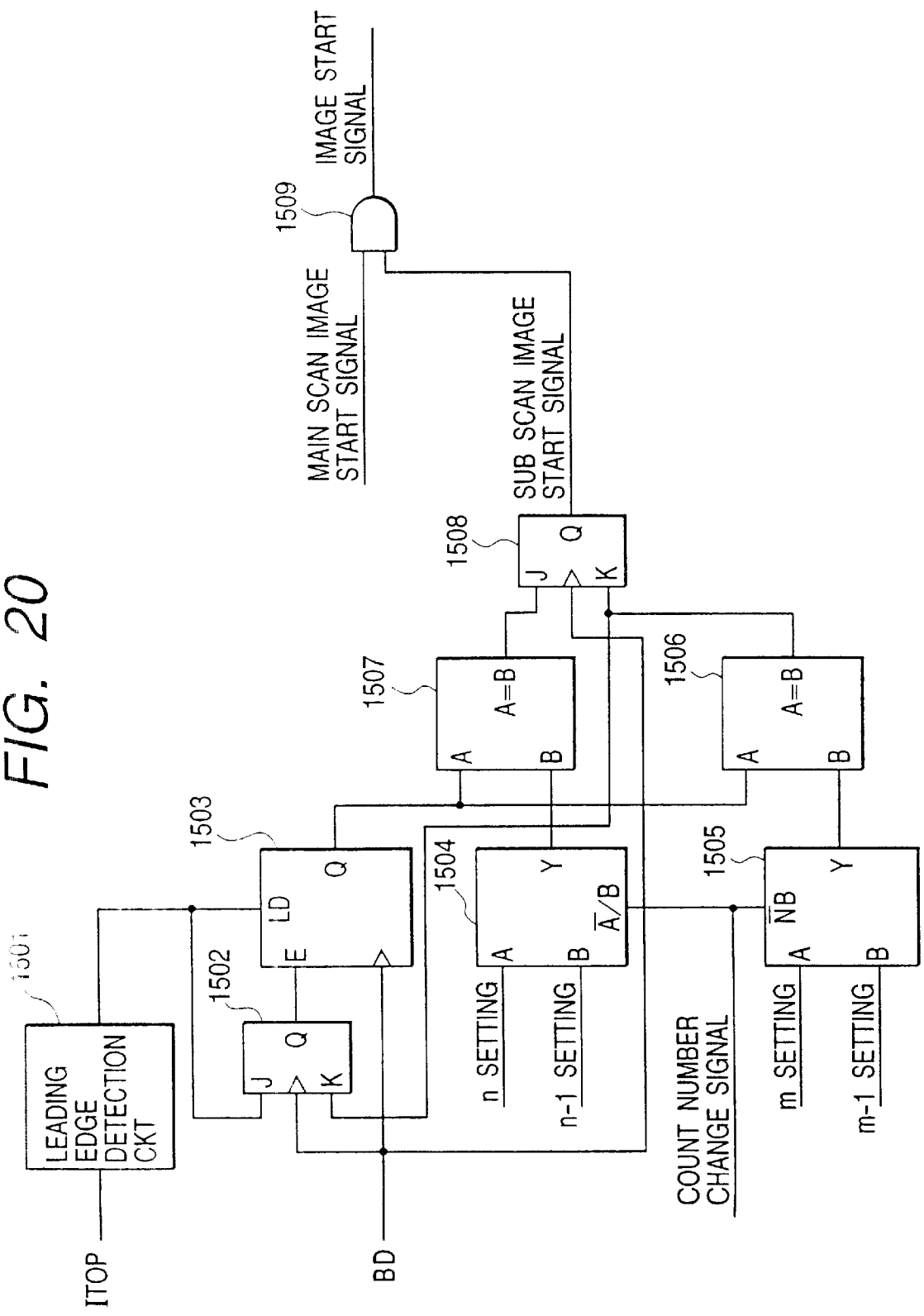

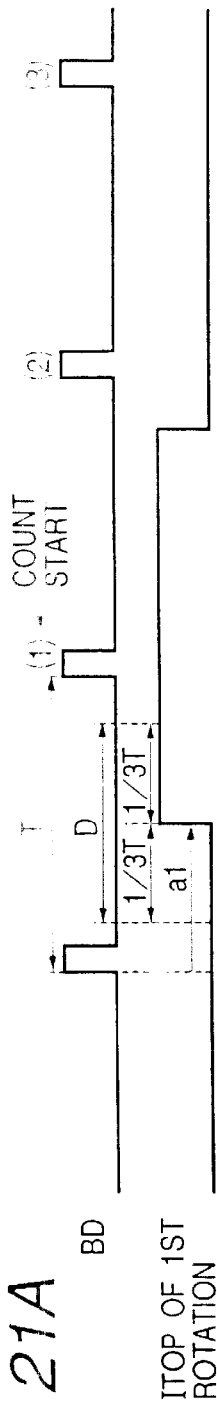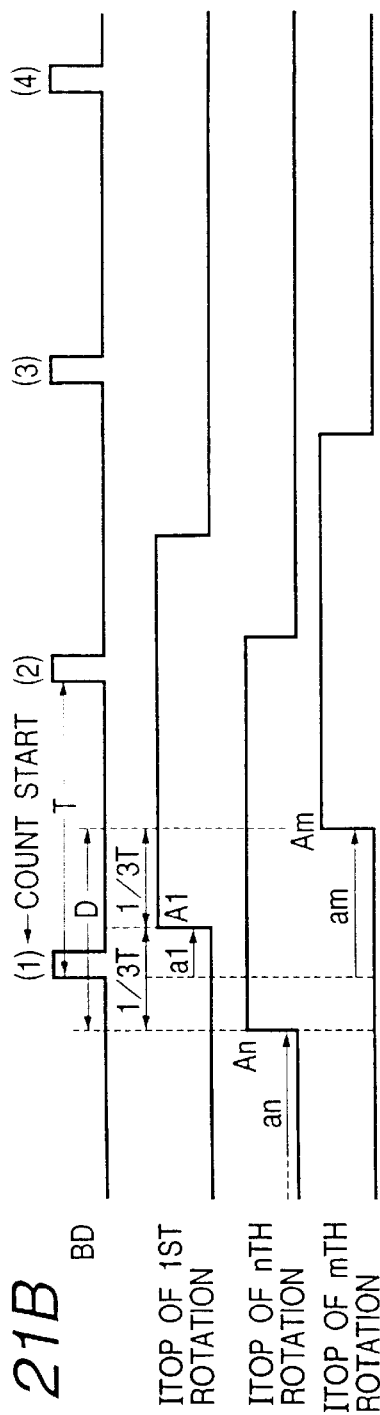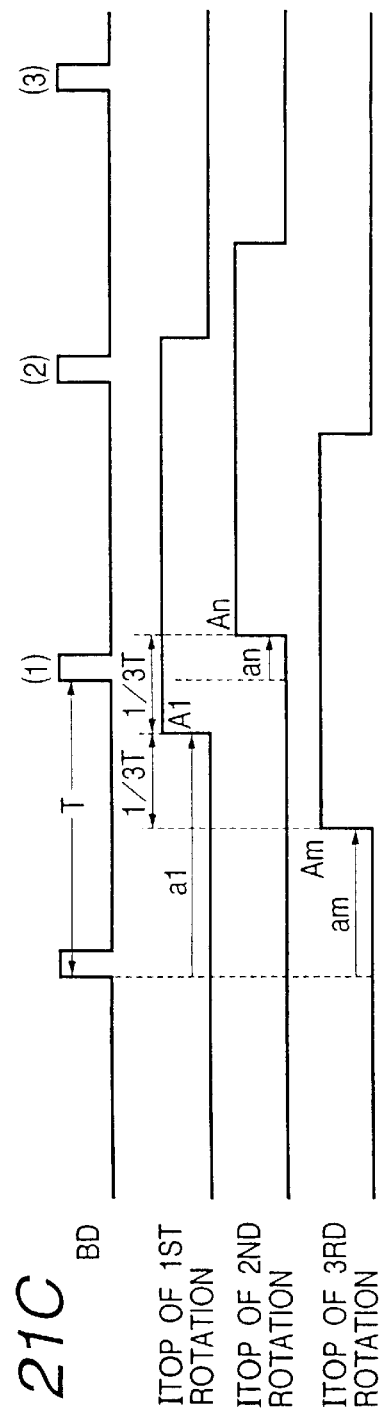

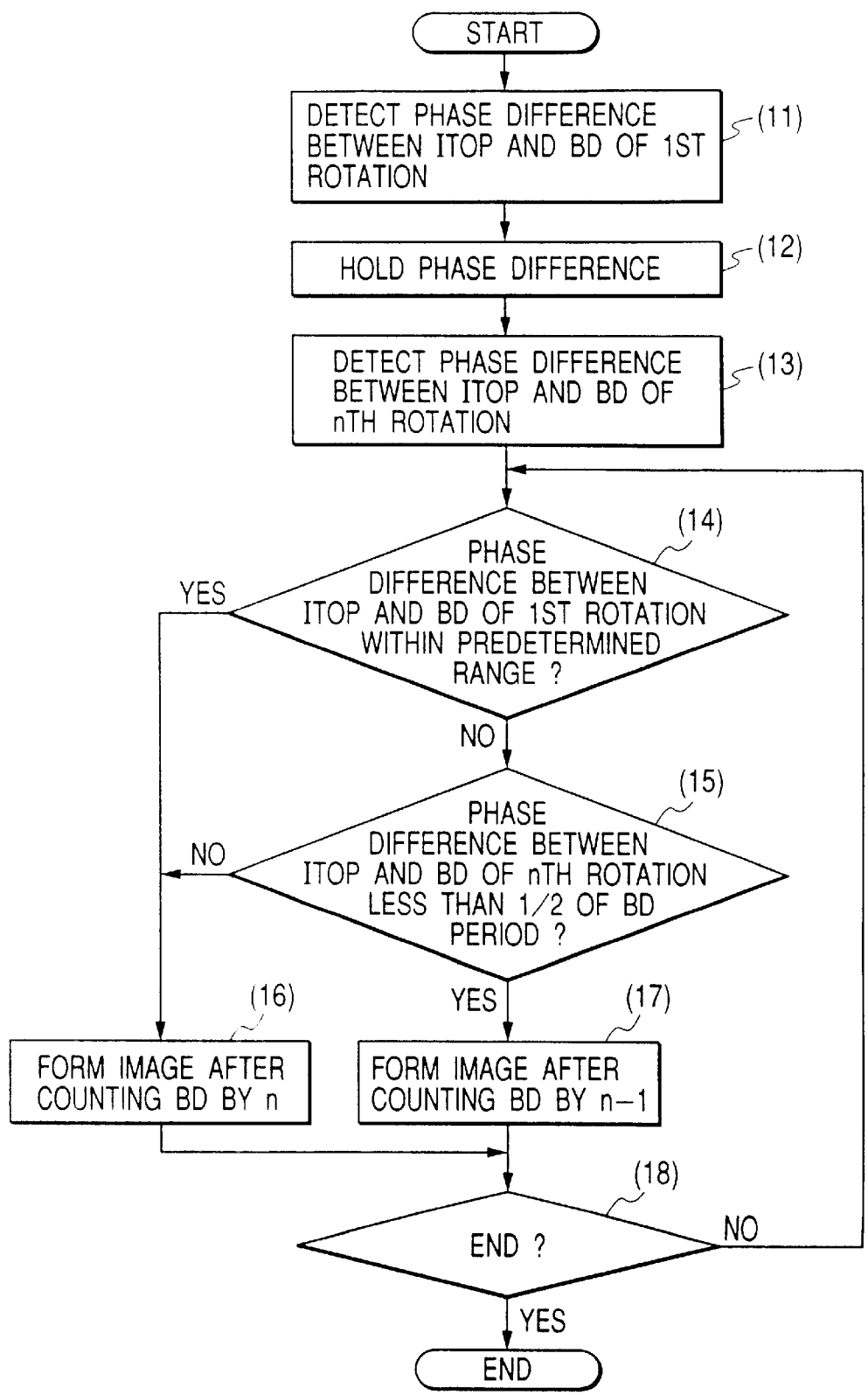

IMAGE FORMING APPARATUS AND CONTROLLING METHOD THEREFOR

BACKGROUND OF THE INVENTION

1. Field of the Invention

The present invention relates to an image forming apparatus capable of forming a multi-color image by superposing in succession color component images formed according to the image information of respective color components, and a controlling method for such image forming apparatus.

2. Related Background Art

For printing color image data, there is conventionally known a color image forming apparatus, such as a laser beam printer (LBP), adapted to form a color image by forming a latent image, line by line, on a photosensitive member utilizing main scanning means such as a rotary polygonal mirror which scans the photosensitive member with a laser beam, then forming an image of each color component by developing the latent image with the developer of each color component such as magenta (M), cyan (C), yellow (Y) or black (Bk), and transferring the images of respective color components in superposed manner onto a sheet fixed on a transfer drum.

There is also known an apparatus in which the images of respective color components, formed in succession on the photosensitive member, are transferred in superposed manner on an intermediate transfer member and the color images on the intermediate transfer member are collectively transferred onto the sheet.

In such apparatus, the photosensitive member and the transfer drum or the intermediate transfer member are driven at a constant speed in a direction (sub scanning direction) perpendicular to the main scanning direction, and the superposed image transfer, color by color, onto the sheet on the transfer drum or onto the intermediate transfer member is conducted in synchronization with a sub scanning start signal generated at each rotation of the photosensitive drum, the transfer drum or the intermediate transfer member.

There is also known an apparatus capable of forming images of respective color components in superposed manner on the photosensitive member and collectively transferring such images onto the recording sheet.

In such conventional color image forming apparatus as described in the foregoing, in order to prevent deterioration in the image quality of the color image resulting from the aberration in the superposing position of the color images, the method of controlling the positions of the respective color images in superposition plays an important role.

As an example of such position controlling method, there is proposed a method of employing such a configuration that the number of the sub scan start signal (ITOP signal) generated during a rotation of the photosensitive member or the intermediate transfer member and that of the main scan recording line signal (BD signal) synchronized therewith become an integer (cf. FIG. 9B) thereby synchronizing the rotation of the motor driving the photosensitive member or the intermediate transfer member and that of the scanner motor for effecting the main scanning.

FIGS. 9A and 9B are schematic views showing main scanning lines formed on the photosensitive member or the intermediate transfer member in the conventional image forming apparatus.

Referring to FIGS. 9A and 9B, there is shown an image bearing member 901 such as a photosensitive member or an intermediate transfer member, which will be represented by a photosensitive member in the following description. An ITOP sensor 802 generates a sub scanning start signal (ITOP signal) by detecting a sensor flag 803 provided in a predetermined position on the lateral face of the photosensitive member 801 at each rotation thereof.

FIG. 9A shows a case where the number of the main scanning start signal (BD signal) obtained during a rotation of the photosensitive member 801 and that of the main scan recording line signals synchronized therewith becomes "n+(½)" (n being an integer), and illustrates the positions of the main scan recording line signal in the first, second, . . . , (n−1)th, n-th lines of a first rotation and in the first line in a second rotation.

As shown in FIG. 9A, during a rotation of the photosensitive member 801, namely during the generation of the ITOP signal, the main scan recording line signal is generated by "n+(½)", so that the first line in the first rotation and the first line in the second rotation are mutually displaced by ½ line corresponding to the fraction.

In the conventional image forming apparatus, in order to avoid such displacement between the first and second rotations, there is proposed such a configuration that the number of the main scan start signal (BD signal) generated during a rotation of the aforementioned photosensitive member or intermediate transfer member and that of the main scan recording line signal synchronized therewith become an integer, as exemplified in FIG. 9B.

FIG. 9B shows a case where the number of the main scanning start signal (BD signal) obtained during a rotation of the photosensitive member 801 and that of the main scan recording line signals synchronized therewith become n (n being an integer), and illustrates the positions of the main scan recording line signal in the first, second, . . . , (n−1)th, n-th lines of a first rotation and in the first line in a second rotation.

As shown in FIG. 9B, during a rotation of the photosensitive member 801, namely during generation of the ITOP signal, the main scan recording signal is generated by n (integer), so that the first line in the first rotation and the first line in the second rotation mutually overlap without aberration.

In the following there will be explained, with reference to FIGS. 10 and 11, a method of synchronizing the rotation of the motor for driving the photosensitive member or the intermediate transfer member and that of the scanner motor for effecting the main scanning, in the conventional image forming apparatus.

A first method consists of dividing the frequency of the main scanning start signal (BD signal), generated along the rotation of the scanner motor, and utilizing thus obtained signal as the reference clock signal for the motor for driving the photosensitive member or the intermediate transfer member. In the following there will be explained an example of such configuration.

FIG. 10 shows the configuration of a conventional image forming apparatus, corresponding to the first method described above.

Referring to FIG. 10, a photosensitive member 901 is rotated, through a driving belt 908, by a photosensitive member driving motor 907. A scanner motor 902 is controlled at a constant revolution by a PLL circuit 910, based on a reference clock signal supplied from an oscillator 911, and rotates a polygonal mirror 903. The polygonal mirror 903 deflects a laser beam emitted by a laser 904, thereby line scanning the surface of the photosensitive member 901.

A beam detecting sensor (BD sensor) 906 is positioned in a non-image area on the scanning line of the laser beam, and generates a main scanning start signal (BD signal) in each scanning line of the laser beam, namely in synchronization with the rotation of the scanner motor. A PLL circuit 909 effects constant-speed control of the photosensitive member driving motor 907, utilizing the BD signal, generated by the BD sensor 906, as the reference clock signal. In this manner the rotation of the scanner motor 902 and that of the photosensitive member driving motor 907 can be synchronized.

A second method consists of utilizing a common clock signal as the reference clock signal for the motor for driving the photosensitive member or the intermediate transfer member and that for the scanner motor effecting the main scanning. In the following there will be explained an example of such configuration.

FIG. 11 shows the configuration of a conventional image forming apparatus, corresponding to the second method described above.

Referring to FIG. 11, a photosensitive member 1001 is rotated, through a driving belt 1008, by a photosensitive member driving motor 1007. A scanner motor 1002 is controlled at a constant revolution by a PLL circuit 1010, based on a reference clock signal supplied from an oscillator 1011, and rotates a polygonal mirror 1003. The polygonal mirror 1003 deflects a laser beam emitted by a laser 1004, thereby line scanning the surface of the photosensitive member 1001.

A PLL circuit 1009 effects constant-speed control of the photosensitive member driving motor 1007, utilizing a reference clock signal generated by an oscillator 1011, used for the PLL control of the scanner motor 1002. In this manner the rotation of the scanner motor 1002 and that of the photosensitive member driving motor 1007 can be synchronized.

By synchronizing the rotation of the motor driving the photosensitive member and that of the scanner motor for controlling the main scanning by the aforementioned first or second method while adopting such a configuration that the number of the main scanning start signal (BD signal) generation during a rotation of the photosensitive member or the intermediate transfer member and that of the main scanning recording line signal become an integer, it is rendered possible to achieve position alignment without aberration in the start position of sub scanning, even after a number of rotations of the photosensitive member or the intermediate transfer member.

For controlling the sub scanning start position, there is also known a third method for matching the phase of the main scanning start signal and the sub scanning start signal, enabling position alignment regardless whether the number of the main scanning start signal (BD signal) obtained during a rotation of the photosensitive member or the intermediate transfer member and that of the main scanning recording line signal synchronized therewith is an integer or not. In the following there will be explained an example of such configuration.

FIG. 12 shows the configuration of a conventional image forming apparatus, corresponding to the above-described third method.

Referring to FIG. 12, a photosensitive member 1101 is rotated, through a driving belt 1108, by a photosensitive member driving motor 1107. A PLL circuit 1109 effects constant-speed control of the photosensitive member driving motor 1107, utilizing a reference clock signal generated by an oscillator 1114. An ITOP sensor 1115 generates an ITOP signal when the ITOP sensor 1115 is shielded by a sensor flag 1116 in each rotation of the photosensitive member 1101. The writing start position of the first line on the surface of the photosensitive member 1101 is determined, based on the ITOP signal.

A phase matching circuit 1112 effects phase matching between the reference clock signal generated by an oscillator 1113 and the ITOP signal generated by the ITOP sensor 1115. A PLL circuit 1110 effects constant-speed control of the scanner motor 1102 based on the reference clock signal which is phase matched with the ITOP signal by the phase matching circuit 1112.

By the phase matching of the ITOP signal and the reference clock signal by the phase matching circuit 1112, the rotational phase of the scanner motor 1102 is corrected always at a same value at each ITOP signal. Consequently the rotational phase of the polygonal mirror 1103 driven by the scanner motor 1102 is synchronized with the ITOP signal, and the line scanning position of the laser beam, coming from the laser 1104 through the lens 1105, on the surface of the photosensitive member 1101 is always maintained same with reference to the ITOP signal.

FIG. 13 is a schematic view showing the relationship between the actual main scanning lines (main scanning start signal) and the ITOP signal (sub scanning start signal) on the photosensitive member of a conventional image forming apparatus.

Referring to FIG. 13, an image bearing member 1301, such as a photosensitive member or an intermediate transfer member, will be explained hereinafter as a photosensitive member. An ITOP sensor 1302 generates a sub scanning start signal (ITOP signal) by detecting a sensor flag 1303 provided in a predetermined position on the lateral face of the photosensitive member 1301, in each rotation thereof.

A rotation of the photosensitive member 1301 consists of "n+(½)" lines (n being an integer). The ITOP sensor 1302 generates the sub scanning start signal at a predetermined position in each rotation of the photosensitive member 1301. In such configuration, since "n+(½)" main scanning lines are generated during a rotation of the photosensitive drum, the first line in the first rotation and the first line in the second rotation are displaced by the fraction of ½ lines as shown in FIG. 9A.

It is however possible to align the position of the first line for each ITOP signal as shown in FIG. 12, by synchronizing, by means of the phase matching circuit 1112, the rotational phase of the scanner motor 1102 for effecting the main scanning (sub scanning start signal) with the ITOP signal at each generation of the ITOP signal (sub scanning start signal).

It is thus rendered possible to achieve position alignment even after a number of rotations of the photosensitive member or the intermediate transfer member.

However the positional aberration preventing technology based on the above-described configurations assumes that all the environments of the apparatus are ideal, and such technology is therefore insufficient in practice.

For example, the rotation speed of the photosensitive member shows certain fluctuation for example by a variation in the load or by the backlash of the driving transmission gears. Such fluctuation in the rotation speed results in a variation in the phase difference between the main scanning start signal and the sub scanning start signal, whereby a color aberration is generated in case of employing the aforementioned methods of maintaining the position of the laser scanning line constant on the photosensitive member in the image forming apparatus. Such variation can be suppressed to about ⅕ to ⅙ of a line by minimizing the fluctuation in the load of the motor or by improving the precision of the mechanical drive transmission system.

However, if the phases of the sub scanning start signals for the respective colors to be superposed are positioned across the main scanning start signal, there will result an aberration of a line, though the aberration of each line is in fact a fraction of a line.

FIG. 14 is a timing chart showing the timing of image formation in the conventional image forming apparatus, showing a case where the phases of the sub scanning start signals of the respective colors are positioned across the main scanning start signal.

As shown in FIG. 14, as the sub scanning start signal 1204 for the first rotation is generated slightly before the main scanning start signal (1), the scanning of the first line (1206) is started in synchronization with the main scanning start signal (1), while the scanning of the second line (1207) is started in synchronization with the main scanning start signal (2), and the scanning of the third line (1208) is started in synchronization with the main scanning start signal (3).

However, as the sub scanning start signal 1205 for the second rotation is generated slightly after the main scanning start signal (1), the main scanning start signal (1) cannot be recognized. Consequently the scanning of the first line (1207) is started in synchronization with the main scanning start signal (2), and that of the second line (1208) is started in synchronization with the main scanning start signal (3).

Consequently there results the aberration of a line between the first rotation and the second rotation. The following description refers to FIG. 15.

FIG. 15 is a schematic view showing a situation where the phases of the sub scanning start signals are positioned across the main scanning start signal in the conventional image forming apparatus, wherein elements same as those in FIG. 14 are represented by same numbers.

Referring to FIG. 15, an image bearing member 1201 such as a photosensitive member or an intermediate transfer member will hereinafter be explained as a photosensitive member. An ITOP sensor 1202 is shielded by a sensor flag 1203 in each rotation of the photosensitive member 1201, thereby generating a sub scanning start signal.

The sub scanning start signal 1204 for the first rotation is generated slightly before the main scanning start signal (1), while the sub scanning start signal 1205 for the second rotation is generated slightly after the main scanning start signal (1), and the first line 1206 in the first rotation and the first line 1207 in the second rotation are mutually displaced by a line. Such situation will be explained in more details with reference to FIG. 16.

FIG. 16 is a timing chart showing the timing of image formation in the conventional image forming apparatus, showing the details of the timing chart shown in FIG. 14, wherein elements same as those in FIG. 14 are represented by same numbers.

In the conventional image forming apparatus, after n count of a video clock signal (video CLK) in synchronization with the main scanning start signal, a memory read-out signal is generated during m count of the video CLK signal and the recording data are read from an unrepresented memory in synchronization with the memory read-out signal. The recording data read from the memory are used for laser scanning for each line and thus recorded on the photosensitive member. The sub scanning start signal is generated at a predetermined position in each rotation of the image bearing member, and becomes effective from the main scanning start signal after the sub scanning start signal is shifted from L-level to H-level, thus generating the memory read-out signal.

In the color image forming apparatus in which the images of plural colors are transferred in superposed manner, the latent image formation or the image transfer is repeated plural times. FIG. 16 shows an example of repeating such process twice, wherein the sub scanning start signal for the first rotation is generated slightly before the cycle of the main scanning start signal while that for the second rotation is generated slightly after the cycle of the main scanning start signal.

As shown in FIG. 16, the sub scanning start signal 1204 generated in the first rotation is generated slightly before the main scanning start signal (1), so that the main scanning start signal (1) becomes effective and the timing of the memory read-out signal for the first line of the image is synchronized with the main scanning start signal (1). Consequently the memory read-out signal is generated after n count of the video clock signal from the main scanning start signal (1).

The sub scanning start signal 1206 generated in the second rotation is shifted to the later side because of a fluctuation in the rotation of the image bearing member.

In such case, the sub scanning start signal is generated slightly after the main scanning start signal (1), so that the main scanning start signal (1) is not detected and the memory read-out signal for the first line of the image is synchronized with the main scanning start signal (2). Therefore, the memory readout signal for the second rotation is generated after n count of the video clock signal from the main scanning start signal (2) as shown in FIG. 16.

Consequently, there results an aberration of a line between the memory read-out signal for the first rotation and that for the second rotation. Therefore, in recording the image data read from the memory onto the photosensitive member in successive lines, the first lines which should mutually overlap are mutually displaced, and the first line in the first rotation overlaps with the second line in the second rotation to result in color aberration.

Thus the conventional technologies have been associated with a drawback of generating an aberration of one line or larger in the image recording start positions of the respective colors, because of the fluctuation in the phase difference between the main sub scanning start signal and the main scanning start signal, resulting from a variation in the rotation speed of the photosensitive member etc., caused by a fluctuation in the load or by the backlash in the driving transmission gears.

SUMMARY OF THE INVENTION

An object of the present invention is to resolve the aforementioned drawbacks and to provide an image forming apparatus and a controlling method therefor, capable of forming an image of high quality without color aberration by matching the image recording start positions of the respective color components even in case the rotation speed of the photosensitive member etc. fluctuates for example by a variation in the load or by the backlash in the driving transmission gears.

The above-mentioned object can be attained, according to the present invention, by an image forming apparatus for forming a multi-color image by superposing in succession color component images formed according to the image information of respective color components, comprising:

a rotary polygonal mirror for deflecting a light beam based on the image information of each of the color components thereby scanning a rotated image bearing member;

main scanning start signal generation means for generating a main scanning start signal by detecting the light beam put in a scanning motion by the rotary polygonal mirror;

sub scanning start signal generation means for generating a sub scanning start signal in synchronization with the rotation of the image bearing member;

comparator means for detecting and retaining the phase difference between the sub scanning start signal and the main scanning start signal at a predetermined timing, also detecting the phase difference between the sub scanning start signal and the main scanning start signal at each formation of the color component image, and comparing the phase difference detected at the predetermined timing and the phase difference detected at each formation of the color component image; and control means for controlling the timing of starting image formation, based on the result of comparison by the comparator means.

There is also provided an image forming apparatus for forming a multi-color image by superposing in succession color component images formed according to the image information of respective color components, comprising:

a rotary polygonal mirror for deflecting a light beam based on the image information of each of the color components thereby scanning a rotated image bearing member;

main scanning start signal generation means for generating a main scanning start signal by detecting the light beam put in a scanning motion by the rotary polygonal mirror;

sub scanning start signal generation means for generating a sub scanning start signal in synchronization with the rotation of the image bearing member;

first discrimination means for detecting and retaining the phase difference between the sub scanning start signal and the main scanning start signal at a predetermined timing, and discriminating whether the phase difference detected at the predetermined timing is within a first range;

second discrimination means for detecting the phase difference between the sub scanning start signal and the main scanning start signal at each formation of the color component image, and discriminating whether the phase difference detected at each formation of the color component image is within a second range; and control means for controlling the timing of starting image formation, based on the result of discrimination by the first and second discrimination means.

Another object of the present invention is, in recording by superposing images of plural colors, to achieve satisfactory counting of the beam detection (BD) signal based on the phase difference between the BD signal and the ITOP signals of the respective colors.

The above-mentioned object can be attained, according to the present invention, by an image forming apparatus for forming a multi-color image by superposing in succession color component images formed according to the image information of respective color components, comprising:

a rotary polygonal mirror for deflecting a light beam based on the image information of each of the color components thereby scanning a rotated image bearing member;

main scanning start signal generation means for generating a main scanning start signal by detecting the light beam put in a scanning motion by the rotary polygonal mirror;

sub scanning start signal generation means for generating a sub scanning start signal in synchronization with the rotation of the image bearing member;

interpretation means for interpreting the count number of the main scanning start signal after a predetermined sub scanning start signal, according to the phase difference of the sub scanning start signal for each color component with respect to a certain main scanning start signal; and control means for controlling the timing of image formation, based on the interpretation by the interpretation means.

Still other objects of the present invention, and the features thereof, will become fully apparent from the following description to be taken in conjunction with the attached drawings and from the appended claims.

BRIEF DESCRIPTION OF THE DRAWINGS

FIG. 20 is a circuit diagram showing the configuration of an image writing timing control circuit shown in FIG. 17;

FIGS. 21A, 21B and 21C are timing charts showing the timing of generation of the main scanning signal and the sub scanning signal in the image forming apparatus of the present invention; and FIG. 22 is a flow chart showing the image writing adjustment sequence in the image forming apparatus of the present invention.

DETAILED DESCRIPTION OF THE PREFERRED EMBODIMENTS

Now the present invention will be clarified in detail by preferred embodiments thereof.

First Embodiment

Figure 1:
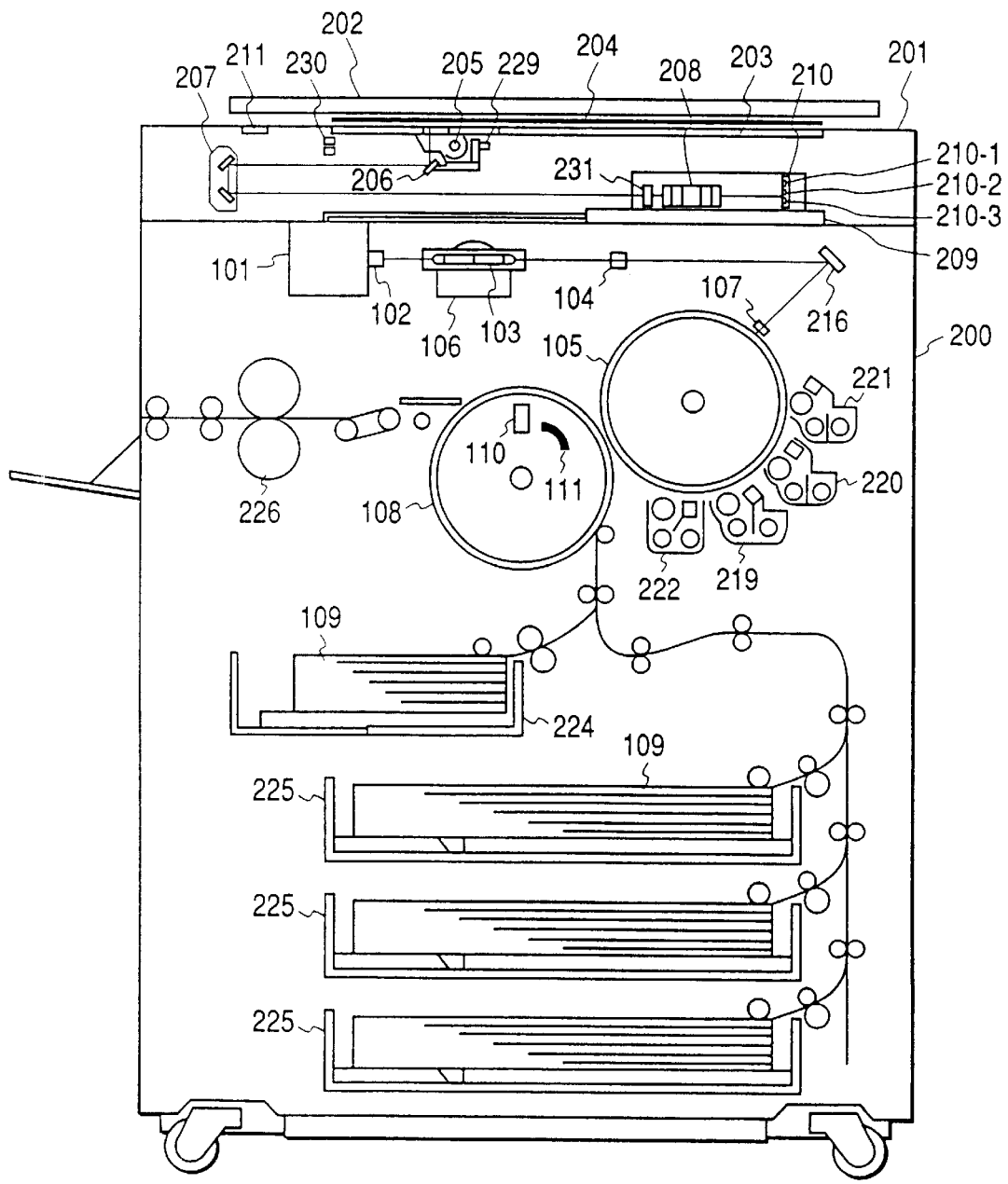
FIG. 1 is a cross-sectional view showing the configuration of an image forming apparatus constituting a first embodiment of the present invention.

FIG. 1 is a cross-sectional view showing the configuration of an image forming apparatus constituting a first embodiment of the present invention.

Referring to FIG. 1, an image scanner unit 201 reads an original and effects digital signal processing. A printer unit 200 prints an image in full color on a recording sheet, based on the original image read by the image scanner 201 or the image data transferred from an external device such as an unrepresented computer through a communication medium.

The present invention allows, particularly in the printing operation based on the image data such as computer graphics entered from the external device, to suppress the color aberration thereby reproducing a satisfactory image.

In the image scanner unit 201, an original pressure plate 202 pressed an original 204 to an original supporting glass 203. A halogen lamp 205 illuminates the original 204 placed on the original supporting glass 203.

A 3-line sensor (hereinafter called CCD) 210 is composed of a red (R) sensor 210-1, a green (G) sensor 210-2 and a blue (B) sensor 210-3 and reads the red (R), green (G) and blue (B) components of the full-color information by color separation of the optical information reflected from the original 204 and focused on the CCD through mirrors 206, 207 and a lens 208 provided with a far infrared cut-off filter 231. A signal processing unit 209 electrically processes the R, G, B signal obtained from the sensors 210-1 to 210-3 to obtain magenta (M), cyan (C), yellow (Y) and black (Bk) components for supply to the printer unit 202.

A standard white board 211 is read by the R, G, B sensors 210-1 to 210-3 for generating correction data. The standard white board 211 has substantially uniform reflective characteristics for the visible and infrared light and appears white in the visible wavelength region. The standard white board is used for correcting the output data of the R, G, B sensors 210-1 to 210-3. A photosensor 230 generates an image top signal VTOP in cooperation with a flag plate 229.

In the printer unit 200, an image writing timing control circuit 101 modulates a semiconductor laser 102 based on the image signals of magenta (M), cyan (C), yellow (Y) and black (Bk) entered from the external device such as an unrepresented computer. A polygonal mirror 103 is rotated by a polygonal motor 106 and deflects the laser beam emitted from the semiconductor laser 102, thereby scanning a photosensitive drum 105 through an f-θ lens 104 and a mirror 216.

The photosensitive drum 105 forms an electrostatic latent image by the laser beam scanning by the polygonal mirror 103. A BD sensor 107 is positioned in the vicinity of the scanning start position of a line of the laser beam and serves to detects the line scanning operation of the laser beam, thereby generating a main scan start signal (scanning start reference signal (BD signal) for the line of a same cycle).

There are provided a magenta developing unit 219, a cyan developing unit 220, a yellow developing unit 221 and a black developing unit 222 for respectively developing the electrostatic latent image on the photosensitive drum 105 thereby forming a toner image. A transfer drum 108 conveys, by suction, a recording sheet 109 fed from a sheet cassette 224 or 225 and serves to transfer the toner image, formed on the photosensitive drum 105, onto the recording sheet 109.

An ITOP sensor 110 senses the passing of a flag 111, fixed in the transfer drum 108, along the rotation thereof, thereby generating a sub scanning start signal (ITOP signal) indicating the top position of the recording sheet adhered on the transfer drum 108. A fixing unit 226 fixed the toner image transferred onto the recording sheet by the transfer drum 108.

In the following there will be explained the functions of the various units.

The original 204 on the original supporting glass 203 is illuminated by the halogen lamp 205, and the light reflected from the original is guided by the mirrors 206, 207 and is focused by the lens 208 onto the CCD 210. The CCD 210 reads the red, green and blue components of the full-color information by separating the optical information from the original and sends these components to the signal process unit 209. The lamp 205 and the mirror 206 are mechanically moved with a velocity v while the mirror 207 is moved with a velocity v/2 in a direction (hereinafter called sub scanning direction) perpendicular to the electrical scanning direction of the line sensors (hereinafter called main scanning direction), thereby scanning-the entire area of th original.

The standard white board 211 is used for correcting the output data from the R, G, B sensors 210-1 to 210-3. The photosensor 230 generates the image top signal VTOP in cooperation with the flag plate 229. The signal process unit 209 electrically processes thus obtained R, G, B signals to provide magenta (M), cyan (C), yellow (Y) and black (Bk) signals for supply to the printer unit 200.

By an original scanning operation in the image scanner unit 201, one of the components M, C, Y and Bk is transferred to the printer unit 200 and a printout is completed by four original scanning operations in total.

The image writing timing control circuit 101 receives the image signal from the scanning unit 201 or from the external device such as the unrepresented computer through the certain communication medium. The control circuit 101 modulates the semiconductor laser 102 according the image signal of magenta, cyan, yellow or black. The laser beam emitted from the semiconductor laser 102 is reflected by the polygonal mirror 103, then subjected to f-θ correction by the f-θ lens 104 and further reflected by the mirror 216 to scan the photosensitive drum 105 thereby forming an electrostatic latent image thereon.

During four rotations of the photosensitive drum 105, the four developing units 219 to 222 are brought in contact with the photosensitive drum 105 in succession to develop the electrostatic latent images of M, C, Y and Bk with the respectively corresponding toners. The recording sheet 109 fed from the sheet cassette 224 or 225 is wound on the transfer drum 108. After the toner images of M, C, Y and Bk colors developed by the developing units are transferred in succession, the recording sheet is discharged through a fixing unit 226.

Figure 2:
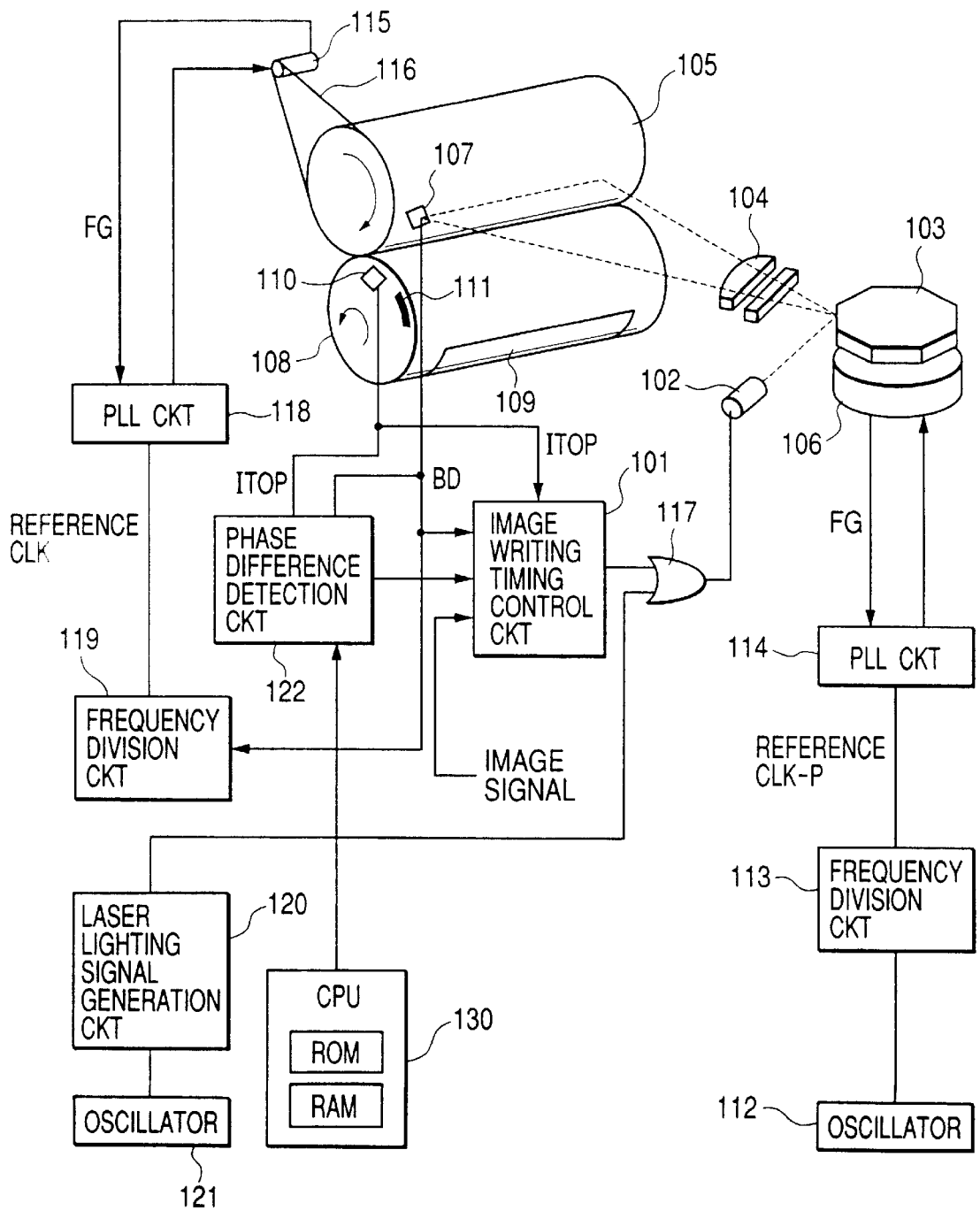
FIG. 2 is a view showing the configuration of a printer unit of the image forming apparatus shown in FIG. 1.

FIG. 2 shows the configuration of the printer unit 200 in the image forming apparatus shown in FIG. 1, wherein the components same as those in FIG. 1 are represented by same numbers.

Referring to FIG. 2, an oscillator 112 generates a clock signal of a predetermined frequency. A frequency division circuit 113 divides the frequency of the clock signal from the oscillator 112 with a predetermined frequency division ratio, thereby generating a polygonal motor driving pulse signal (reference CLK-P signal). A PLL circuit 114 detects the phase difference and the frequency deviation between a motor FG pulse signal generated by the rotation of the polygonal motor 106 and the reference CLK-P signal and executes PLL control on the driving voltage to the polygonal motor 106 in such a manner that these signals are matched in phase.

An oscillator 121 generates a clock signal of a predetermined frequency. A laser lighting signal generation circuit 120 receives the clock signal from the oscillator 121 and the BD signal from the BD sensor 107 and generates a laser lighting signal for BD signal detection. A phase difference detection circuit 122 receives the ITOP signal from the ITOP sensor 110, the BD signal from the BD sensor 107 and a latch control signal from a CPU 130 and detects the phase difference between the BD signal and the ITOP signal to generate a detection signal (phase difference signal).

An image writing timing control circuit 101 receives the ITOP signal from the ITOP sensor 110 and the BD signal from the BD sensor 107, counts the BD signal by a predetermined number n after the detection of the leading edge of the ITOP signal, generates a sub scanning start signal in synchronization with the leading edge of the n-th BD signal and outputs the image signal at the timing of such sub scanning start signal. The sub scanning start signal is outputted corresponding to BD signals of m counts, determined by the length of the recording sheet. The image writing timing control circuit 101 also receives the detection signal (phase difference signal) from the phase difference detection circuit 122 and changes the count n of the BD signal by a predetermined number, thereby controlling the timing of generation of the sub scanning start signal.

An OR gate 117 sends the image signal from the image writing timing control circuit 101 or the laser lighting signal for the BD signal detection from the laser lighting signal generation circuit 120, thereby modulating the semiconductor laser 102.

A frequency division circuit 119 divides the frequency of the BD signal from the BD sensor 107 with a predetermined frequency division ratio, thereby generating a photosensitive drum motor driving pulse signal (reference CLK signal). A PLL circuit 118 detects the phase difference and the frequency deviation between the motor GF pulse signal generated by the rotation of the photosensitive drum motor 115 and the reference CLK signal and effects PLL control for controlling the driving voltage to the photosensitive drum motor 115 in such manner that these signals mutually match in phase. A CPU 130 is provided with a RAM and a ROM therein and controls the entire image forming apparatus according to a program stored in the ROM.

In the following there will be explained the functions of the various units.

The image writing timing control circuit 101 receives the image signal transferred from the scanner unit 201 shown in FIG. 1 or from the external device such as an unrepresented computer through certain communication medium, and modulates the semiconductor laser 102 through the OR gate 117 according the image signal of magenta, cyan, yellow or black. The laser beam is reflected by the polygonal mirror 103, then subjected to f-θ correction by the f-θ lens 104 and further reflected by the mirror 216 (shown in FIG. 1) to scan the photosensitive drum 105 thereby forming an electrostatic latent image thereon.

The polygonal motor 106 is driven by the polygonal motor driving pulse signal (reference CLK-P signal) generated in the frequency division circuit 113 by dividing the frequency of the clock signal from the oscillator 112 and supplied to the PLL circuit 114. The PLL circuit 114 detects the phase difference and the frequency deviation between the motor FG pulse signal from the polygonal motor 106 and the reference CLK-P signal and effects PLL control for controlling the driving voltage to the polygonal motor 106 in such a manner that these signals mutually match in phase.

The BD sensor 107 positioned in the vicinity of the scanning start position of the laser beam in a scanning line detects the line scanning of the laser beam and generates the scanning start reference signal (BD signal) for the lines of a same cycle as will be explained later with reference to FIG. 3. Also the ITOP sensor 110 provided in the transfer drum 110 detects the flag 111 fixed therein along the rotation thereof to generate the ITOP signal (indicating the top position of the recording sheet 109 on the transfer drum 108) as will be explained later with reference to FIG. 3. Also the photosensitive drum motor 115 is driven by the motor driving pulse signal (reference CLK signal) obtained by dividing, in the frequency division circuit 119, the frequency of the laser light signal for BD signal detection from the laser lighting signal generation circuit 120 and supplied to the PLL circuit 118.

The PLL circuit 118 detects the phase difference and the frequency deviation between the motor FG pulse signal from the photosensitive drum motor 115 and the reference CLK signal and effects PLL control for controlling the driving voltage to the photosensitive drum motor 115 in such a manner that these signals mutually match in phase. The photosensitive drum 105 is rotated in a direction indicated by a arrow, by the photosensitive drum motor 115 through a gear belt 116 and the transfer drum 108 is rotated in a direction indicated by an arrow (sub scanning direction) at a same speed as that of the photosensitive drum 105, as it is coupled with the photosensitive drum 105 through unrepresented gears. The BD signal and the ITOP signal are supplied to the image writing timing control circuit 101 for sending the image signal to the semiconductor laser 102 at a timing to be explained in the following. After the detection of the leading edge of the ITOP signal, the image writing timing control circuit 101 counts the BD signal by a predetermined number n, and generates the sub scanning start signal (for a duration of BD signal of m counts determined by the length of the recording sheet) in synchronization with the leading edge of the n-th BD signal, thereby irradiating the photosensitive drum 105 with the laser beam modulated with the image signal.

Figure 3:
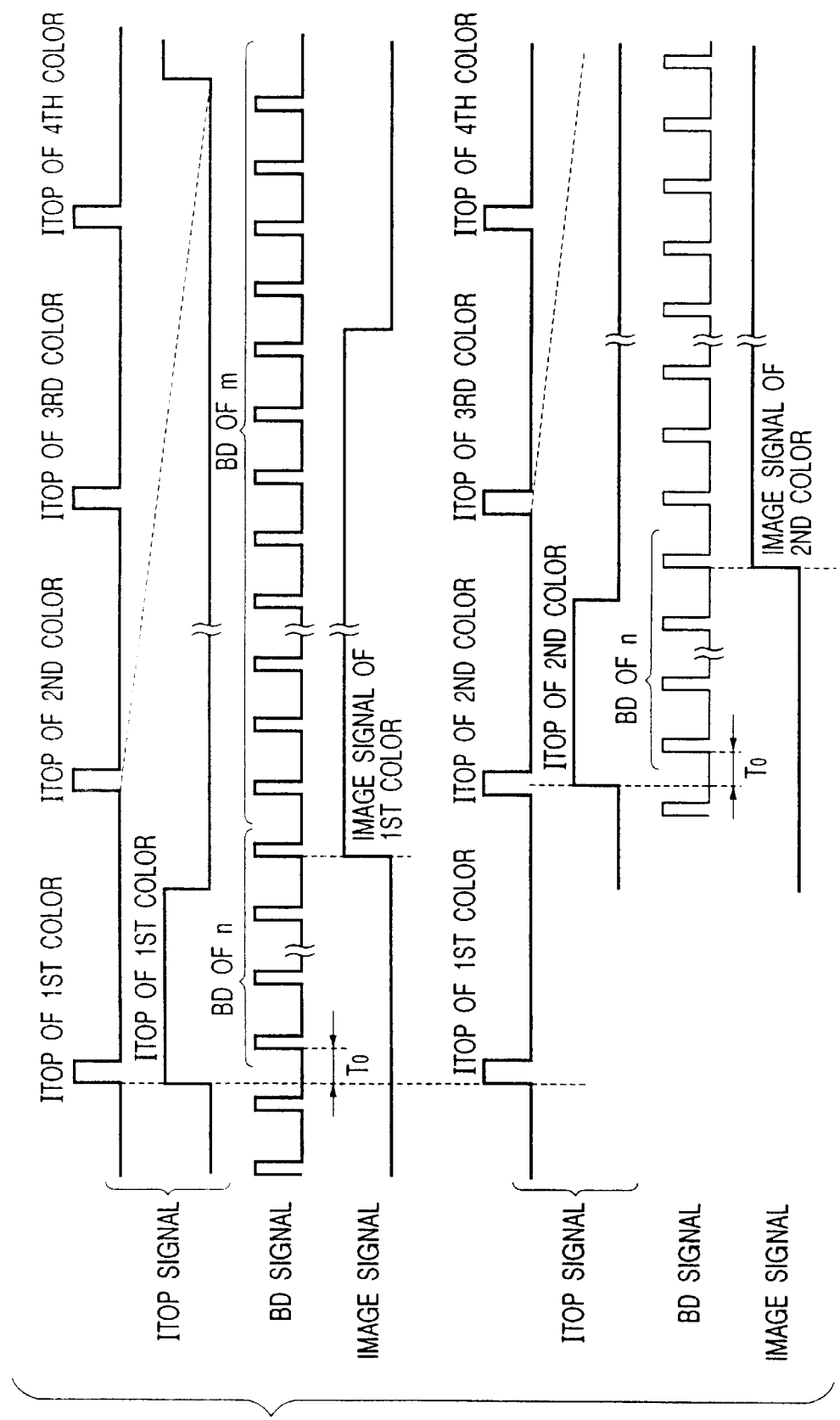
FIG. 3 is a timing chart showing the timing of image formation in the printer unit of the image forming apparatus shown in FIG. 1.

FIG. 3 is a timing chart showing the timing of image formation in the printer unit 200 of the image forming apparatus shown in FIG. 1.

Referring to FIG. 3, the ITOP signal, generated when the ITOP sensor 110 detects the flag 111 fixed in the transfer drum 108 upon rotation thereof and indicating the top position of the recording sheet 109 on the transfer drum 108, is outputted for each color.

The BD signal is the scanning start reference signal for each line of a same cycle, generated by the BD sensor 107, positioned in the vicinity of the scanning start position of the laser beam in each scanning line, upon detection of the line scanning operation of the laser beam.

The BD signal and the ITOP signal are supplied to the image writing timing control circuit 101, and the image signal is supplied to the semiconductor laser 102 through the OR gate 117, in synchronization with the leading edge of the n-th BD signal after the detection of the leading edge of the ITOP signal. More specifically, the sub scanning start signal is generated in synchronization with the leading edge of the n-th (predetermined number) BD signal after the detection of the leading edge of the ITOP signal, and the photosensitive drum 105 is irradiated with the laser beam modulated by the image signal for a duration of m BD signals.

In the present embodiment the BD signal is generated by an integral number during a rotation of the photosensitive drum 105 in such a manner that the scanning laser beam falls on a same position on the photosensitive drum 105 in every rotation, and the BD signal is generated 8192 times during a rotation of the photosensitive drum 105 according to the process speed and the resolution. The gear ratio is selected that a rotation of the photosensitive drum 105 takes 64 rotations of the photosensitive drum motor 115, and a rotation of the photosensitive drum motor 115 requires 32 FG pulses. Therefore, a rotation of the photosensitive drum motor 115 requires 32 reference pulses.

Consequently, a rotation of the photosensitive drum 105 requires 64 rotations×32=2048 pulses. Therefore the reference CLK signal for the photosensitive drum motor 115 is obtained by dividing the frequency of the BD signal to ¼, so that the photosensitive drum 105 executes a rotation during the output of BD signal by 8192 times. The above-mentioned gear ratio n is selected as a natural number, in order to rotate the motor and the reducing gears by an integral number of rotations during a rotation of the photosensitive drum 105, thereby maintaining constant influence of the eccentricity of the motor shaft and the reducing gears in every rotation of the photosensitive drum 105 and canceling the color aberration resulting from such eccentricity.

In the following there will be explained, with reference to FIGS. 4, 5A to 5C, 6 and 7, an example of the method for controlling the timing of image writing in the image forming apparatus of the present invention.

Figure 4:
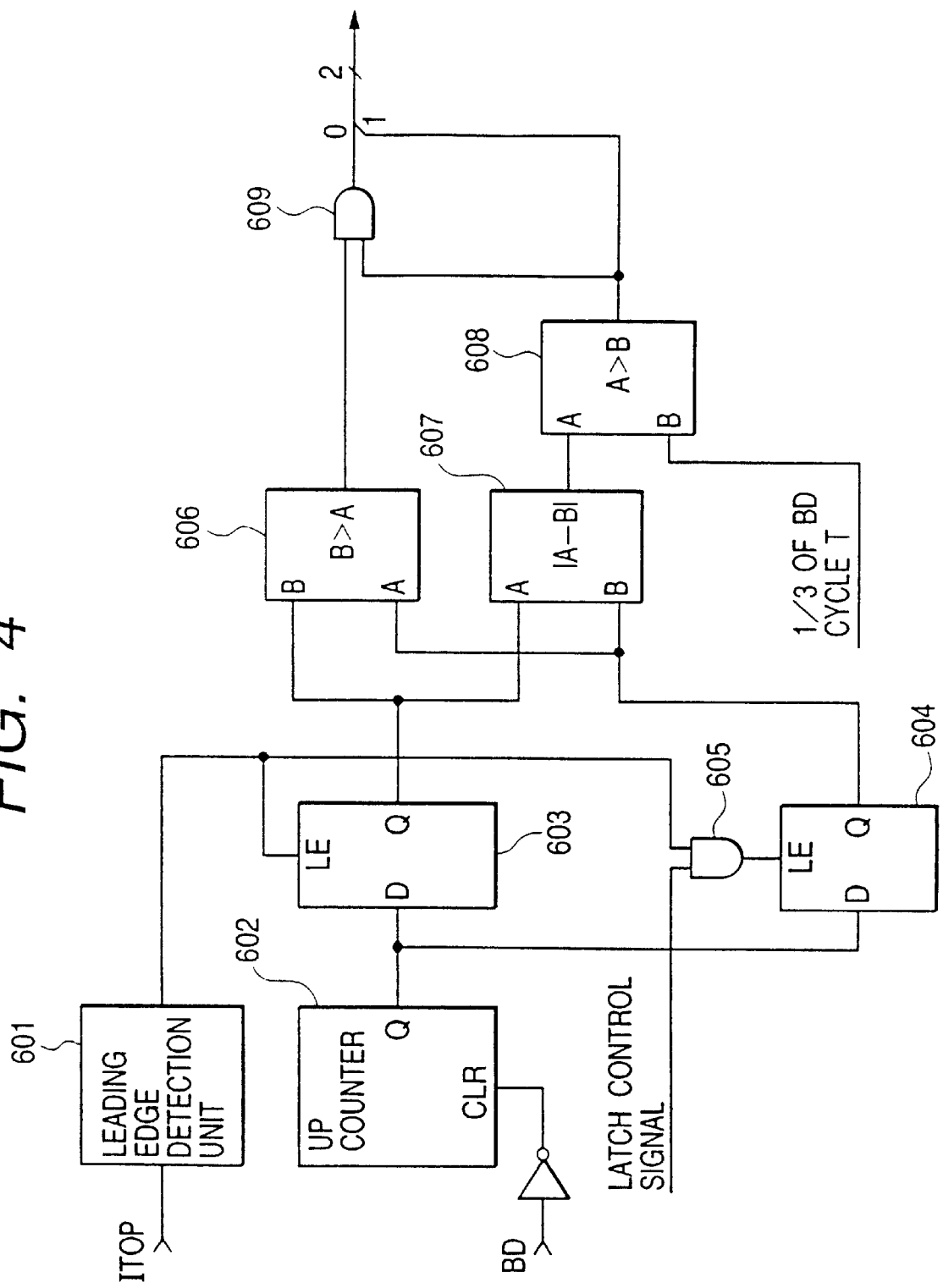
FIG. 4 is a block diagram showing the configuration of a phase difference detection circuit shown in FIG. 2.

FIG. 4 is a block diagram showing the configuration of the phase difference detection circuit 122 shown in FIG. 2.

Referring to FIG. 4, a leading edge detection circuit 601 detects the leading edge of the ITOP signal generated by the ITOP sensor 110 in the transfer drum 108. An up counter 602 consists of a free-run counter which is cleared to zero by the BD signal and repeats the up counting operation, and the count of this counter determines the period of the BD signal.

A latch circuit 603 latches the output of the up-counter 602 at the output timing of the leading edge detection circuit 601. The latched count indicates the leading edge position of the ITOP signal in the period of the BD signal, thus indicating the phase difference between the ITOP signal and the BD signal.

A latch circuit 604 latches the output of the up-counter 602, like the latch circuit 603, when the output of the leading edge detection circuit 601 and the latch control signal from the CPU 130 shown in FIG. 2 are received through an AND gate 605.

The CPU 130 maintains the latch control signal at the H-level only during the output of the image data of the first color but fixes it at the L-level during the output of the second and subsequent colors. Thus the count latched in the latch circuit 603 indicates the leading edge position of the ITOP signal in the period of the BD signal for the second and subsequent colors, while the count latched in the latch circuit 604 indicates the leading edge position of the ITOP signal in the period of the BD signal for the first color. Thus the output of the latch circuit 604 indicates the phase difference between the ITOP signal and the BD signal in the first rotation, while the output of the latch circuit 603 indicates the phase difference between the ITOP signal and the BD signal in the n-th rotation.

A comparator 606 compares the phase difference data between the ITOP signal and the BD signal in the first rotation, outputted from the latch circuit 604 with the phase difference in the n-th rotation outputted from the latch circuit 603, and supplies an AND gate 609 with an H-level signal in case the phase difference in the first rotation is larger.

A subtracter 607 executes subtraction between the phase difference data between the ITOP signal and the BD signal in the first rotation, outputted from the latch circuit 604, and than in the n-th rotation outputted from the latch circuit 603, and sends the absolute value of the result of subtraction to a comparator 608, which compares such result of substraction with a value equal to ⅓ of the period T of the BD signal and outputs an H-level signal or an L-level signal respectively if the result of substraction is larger or smaller than ⅓ of the period T.

The selected value ⅓ of the period T of the BD signal is assumed to be larger in comparison with the fluctuation in the rotational phase of the drum motor and the scanner motor, resulting for example from a variation in the load or from the backlash in the driving transmission gears. For example, in case the period T of the BD signal is 300 $\mu$s, ⅓ of the period is 100 $\mu$s and the difference in the rotational phase between the drum motor and the scanner motor is assumed to be less than 100 $\mu$s.

An AND gate 609 produces the logic product of the outputs of the comparators 606, 608 as a bit 0 of the detection output (phase difference signal). Also the output of the comparator 608 is outputted as a bit 1 thereof. Such functions will be explained in more details with reference to FIGS. 5A to 5C.

Figure 5A:
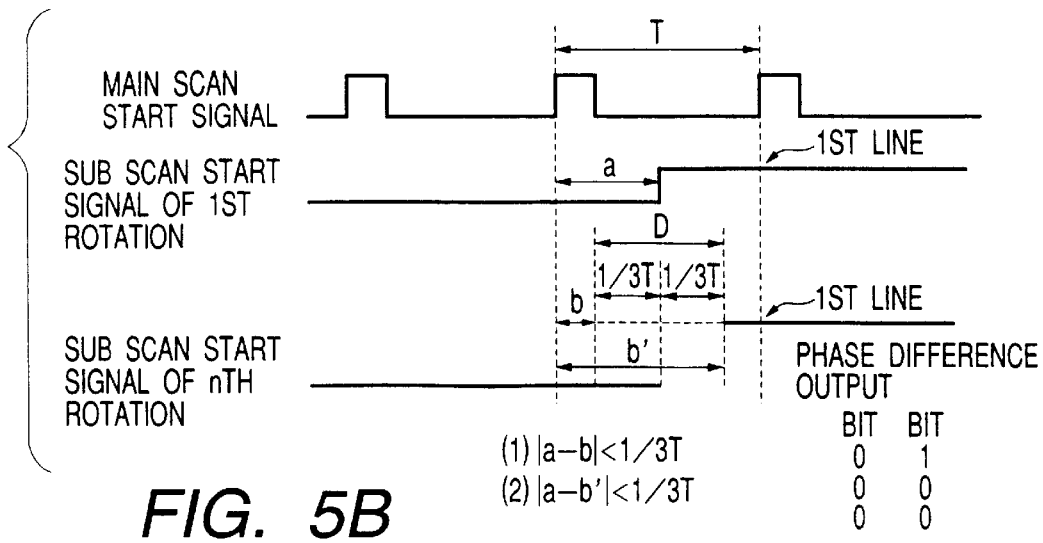
FIGS. 5A, 5B and 5C are timing charts showing the timing of generation of the main scanning signal and the sub scanning signal in the image forming apparatus of the present invention.
Figure 5B:
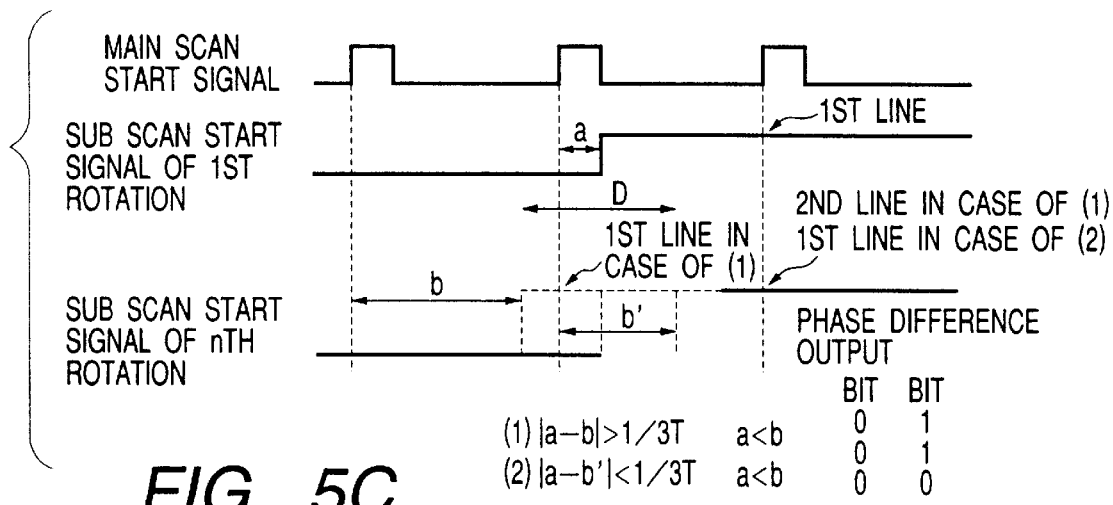
Figure 5C:
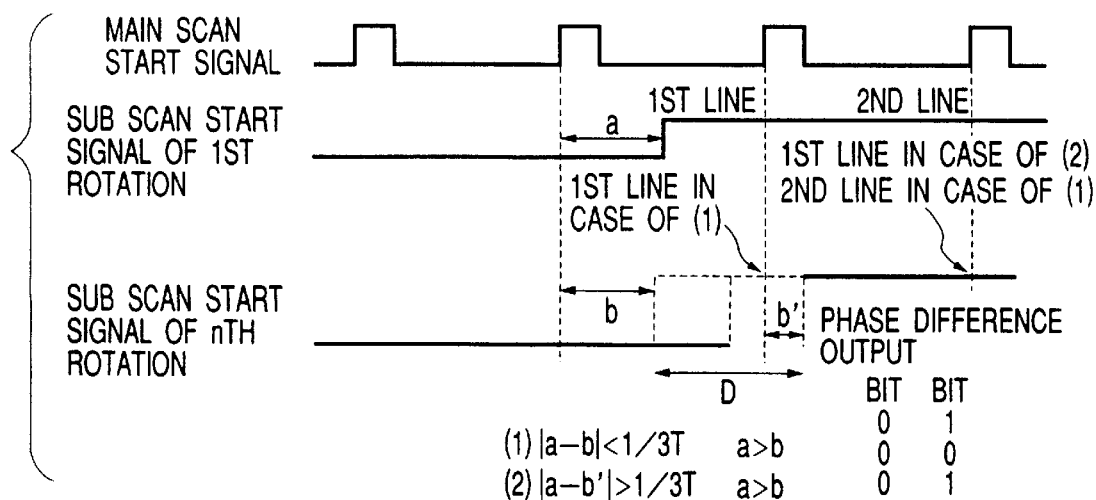

FIGS. 5A to 5C are timing charts showing the timing of generation of the main scanning signal and the sub scanning signal in the image forming apparatus of the present invention.

FIG. 5A shows a case where the sub scanning start signal (ITOP signal) for the first rotation is generated at the approximate center of the period of the main scanning start signal (BD signal), while FIG. 5B shows a case where the sub scanning start signal for the first rotation is generated in the former half of the period of the main scanning start signal, and FIG. 5C shows a case where the sub scanning signal for the first rotation is generated in the latter half of the period.

In the present embodiment, it is assumed that the phase difference between the ITOP signal and the BD signal is within ⅓ of the period T of the BD signal.

In the situation shown in FIG. 5A, the sub scanning start signal (ITOP signal) a for the first rotation is generated at the approximate center of the period of the main scanning start signal (BD signal). The sub scanning start signal b or b' for the n-th rotation is generated in a broken-line area D (within a range of (⅓)T around the sub scanning start signal a for the first rotation) in case the sub scanning start signal a for the first rotation is generated at the approximate center of the period of the main scanning start signal, so that the phase difference becomes largest in case of b'.

As the result of substraction outputted from the subtracter 607 is smaller than ⅓ of the period of the BD signal (|a−b|<(⅓)T, |a−b'|<(⅓)T), the comparator 608 outputs an L-level signal so that both the bits 0 and 1 become "0" in the phase difference output from the phase difference detection circuit 122. In this case the first line in the n-th rotation overlaps with the first line in the first rotation without aberration, as shown in FIG. 5A.

In the situation shown in FIG. 5B, the sub scanning start signal (ITOP signal) a for the first rotation is generated in the former half of the period of the main scanning start signal (BD signal). The sub scanning start signals b and b' for the n-th rotation are generated in a broken-line area D (within a range of (⅓)T around the sub scanning start signal a for the first rotation) in case the sub scanning start signal a for the first rotation is generated in the former half of the period of the main scanning start signal and may be positioned across the main scanning start signal, so that the phase difference becomes largest in case of b where the sub scanning start signals are positioned across the main scanning start signal.

In such case, as the result of substraction outputted from the subtracter 607 is larger than ⅓ of the period of the BD signal (|a−b|>(⅓)T), the comparator 608 outputs an H-level signal, while the comparator 606 outputs an H-level signal because of a situation a<b as shown in FIG. 5B so that both the bits 0 and 1 become "1" in the phase difference output from the phase difference detection circuit 122. In this case the first line in the n-th rotation is generated earlier, by a period of the main scanning start signal, than the first line in the first rotation, as shown in FIG. 5B.

In case the sub scanning start signals are generated not across the main scanning start signal, the result of substraction outputted from the subtracter 607 is smaller than ⅓ of the period of the BD signal (|a−b'|<(⅓)T), so that the comparator 608 outputs an L-level signal and both the bits 0 and 1 become "0" in the phase difference output from the phase detection circuit 122. In this case the first line in the n-th rotation overlaps with the line in the first rotation without aberration, as shown in FIG. 5B.

In the situation shown in FIG. 5C, the sub scanning start signal (ITOP signal) a for the first rotation is generated in the latter half of the period of the main scanning start signal (BD signal). The sub scanning start signals b and b' for the n-th rotation are generated in a broken-line area D (within a range of (⅓)T around the sub scanning start signal a for the first rotation) in case the sub scanning start signal a for the first rotation is generated in the latter half of the period of the main scanning start signal and may be positioned across the main scanning start signal, so that the phase difference becomes largest in case of b' where the sub scanning start signals are positioned across the main scanning start signal.

In such case, as the result of substraction outputted from the subtracter 607 is larger than ⅓ of the period of the BD signal (|a−b'|>(⅓)T), the comparator 608 outputs an H-level signal, while the comparator 606 outputs an H-level signal because of a situation a>b' as shown in FIG. 5B so that both the bit 0 assumes a value "0" while the bit 1 assumes a value "1" in the phase difference output from the phase difference detection circuit 122. In this case the first line in the n-th rotation is generated later, by a period of the main scanning start signal, than the first line in the first rotation.

In case the sub scanning start signals are generated not across the main scanning start signal, the result of substraction outputted from the subtracter 607 is smaller than ⅓ of the period of the BD signal (|a−b|<(⅓)T), so that the comparator 608 outputs an L-level signal and both the bits 0 and 1 become "0" in the phase difference output from the phase detection circuit 122. In this case the first line in the n-th rotation overlaps with the first line in the first rotation without aberration.

As explained in the foregoing, in the output of the phase difference detection circuit 122, the first line of n-th rotation may be displaced with respect to the first line of first rotation, as will be explained in the following.

A case with bits 0 and 1 both being "0" indicates a situation without aberration in the lines. A case with bit 0 being "0" and bit 1 being "1" indicates a situation where the first line in the n-th rotation is generated later, by a period of the main scanning start signal, than the first line in the first rotation. A case with bits 0 and 2 being both "1" indicates a situation where the first line in the n-th rotation is generated earlier, by a period of the main scanning start signal, than the first line in the first rotation.

Thus the phase difference detection circuit 122 detects the phase difference between the sub scanning start signal and the main scanning start signal in the first rotation (for the first color) and in the formation of each color component image, and compares the phase difference detected at a predetermined timing with that detected at the formation of each color component image to generate the phase difference signal for supply to the image writing timing control circuit 101.

Figure 6:
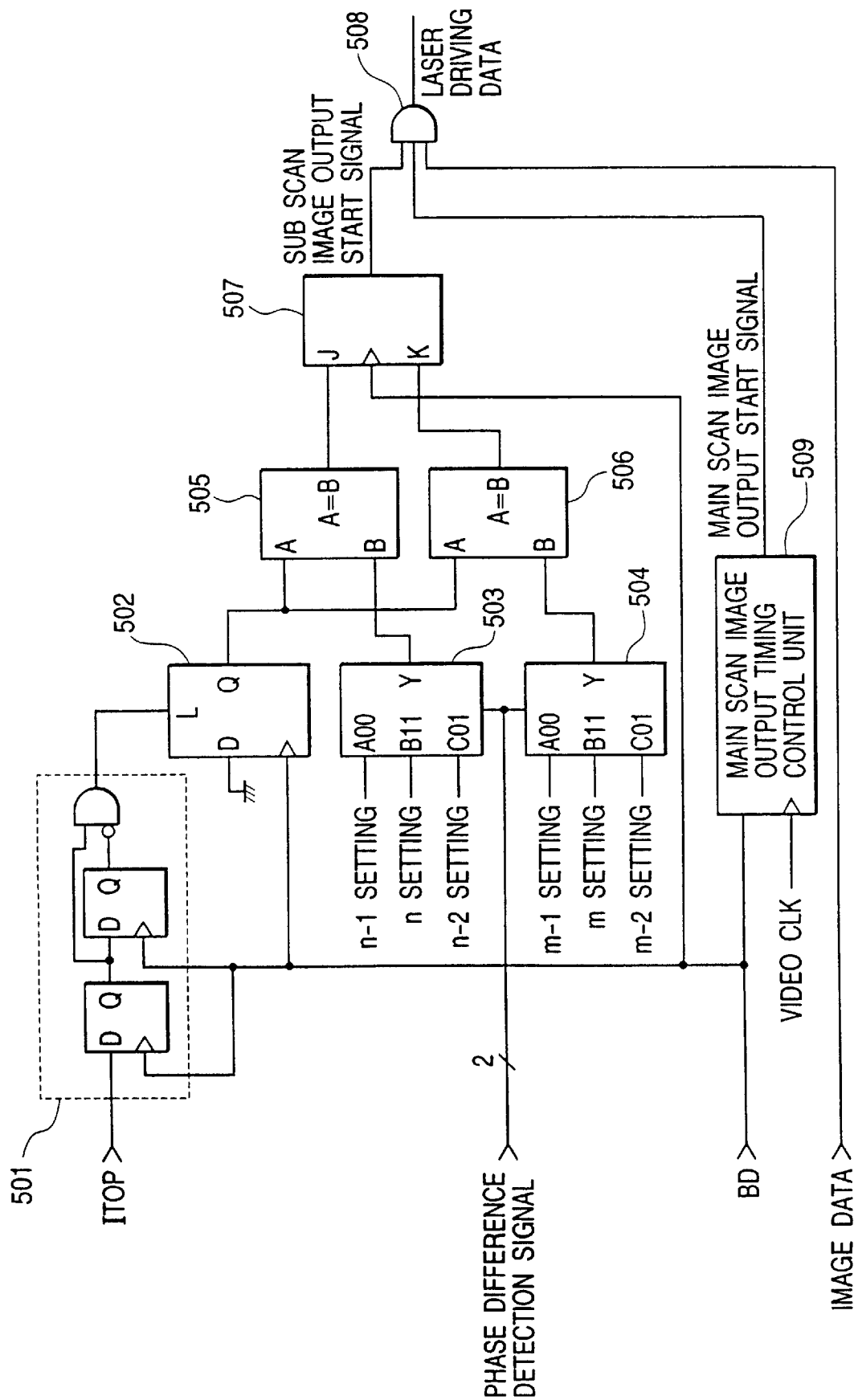
FIG. 6 is a block diagram showing the configuration and function of an image writing timing control circuit shown in FIG. 2.

FIG. 6 is a block diagram showing the configuration and function of the image writing timing control circuit 101 shown in FIG. 2.

Referring to FIG. 6, an ITOP signal leading edge detection circuit 501 detects the leading edge of the ITOP signal to load data "0" in a main scanning line number counter 502, which counts the number of the BD signal and of which count is outputted to comparators 505, 506.

In selectors 503, 504, an input A is the position for the standard sub scanning image output start signal, for generating the sub scanning image output start signal at the n-th line from the reception of the main scanning start signal (ITOP signal). An input B is the position for the sub scanning image output start signal larger by a line than in the standard condition, for generating the sub scanning image output start signal at the (n+1)th line after the reception of the main scanning start signal(ITOP signal). An input C is the position for the sub scanning image output start signal fewer by a line than in the standard condition, for generating the sub scanning image output start signal at the (n−1)th line after the reception of the main scanning start signal (ITOP signal).

The switching operation of the selector 503 is controlled by the output (phase difference signal) from the phase difference detection circuit 122. In case the phase difference signal from the phase difference detection circuit 122 has both the bits 0 and 1 being "0", there is no positional aberration as explained in the foregoing, so that the count need not be changed and the input A is selected.

In case both the bits 0 and 1 are "1", the first line in the n-th rotation is generated earlier by a period of the main scanning start signal then the first line of the first rotation, so that the input B is selected to increase the line number by one count, thereby aligning the position with the sub scanning image output start signals generated in n lines in the first rotation (corresponding to the sub scanning start signal in the second rotation, explained later in FIG. 7).

In case the bit 0 is "0" and the bit 1 is "1", the first line in the n-th rotation is generated later by a period of the main scanning start signal then the first line of the first rotation, so that the input C is selected to decrease the line number by one count, thereby aligning the position with the sub scanning image output start signals generated in n lines in the first rotation (corresponding to the sub scanning start signal in the second rotation, explained later in FIG. 7).

A comparator 505 compares the BD signal count output from the main scanning line number counter 502 with the output of the selector 503, and, in case of coincidence, sets a JK flip-flop (JKFF) 507. A comparator 506 compares the BD signal count output from the main scanning line number counter 502 with the output of the selector 504, and, in case of coincidence, resets the JKFF 507.

The JKFF 507 shifts the sub scanning image output start signal to the H-level in synchronization with the output from the comparator 505 (start of image output), and shifts it to the L-level in synchronization with the output from the comparator 506 (end of image output).

A sub scanning image output timing control unit 509 generates the main scanning image output start signal.

An AND gate 508 effects gating of the output of the sub scanning image output start signal from the JKFF 507, the main scanning image output start signal from the sub scanning image output timing control unit 509 and each bit of the image data, thereby releasing the image data as laser driving data in the image output area only in case the main and sub scanning image output start signal are both in the H-level.

Figure 7:
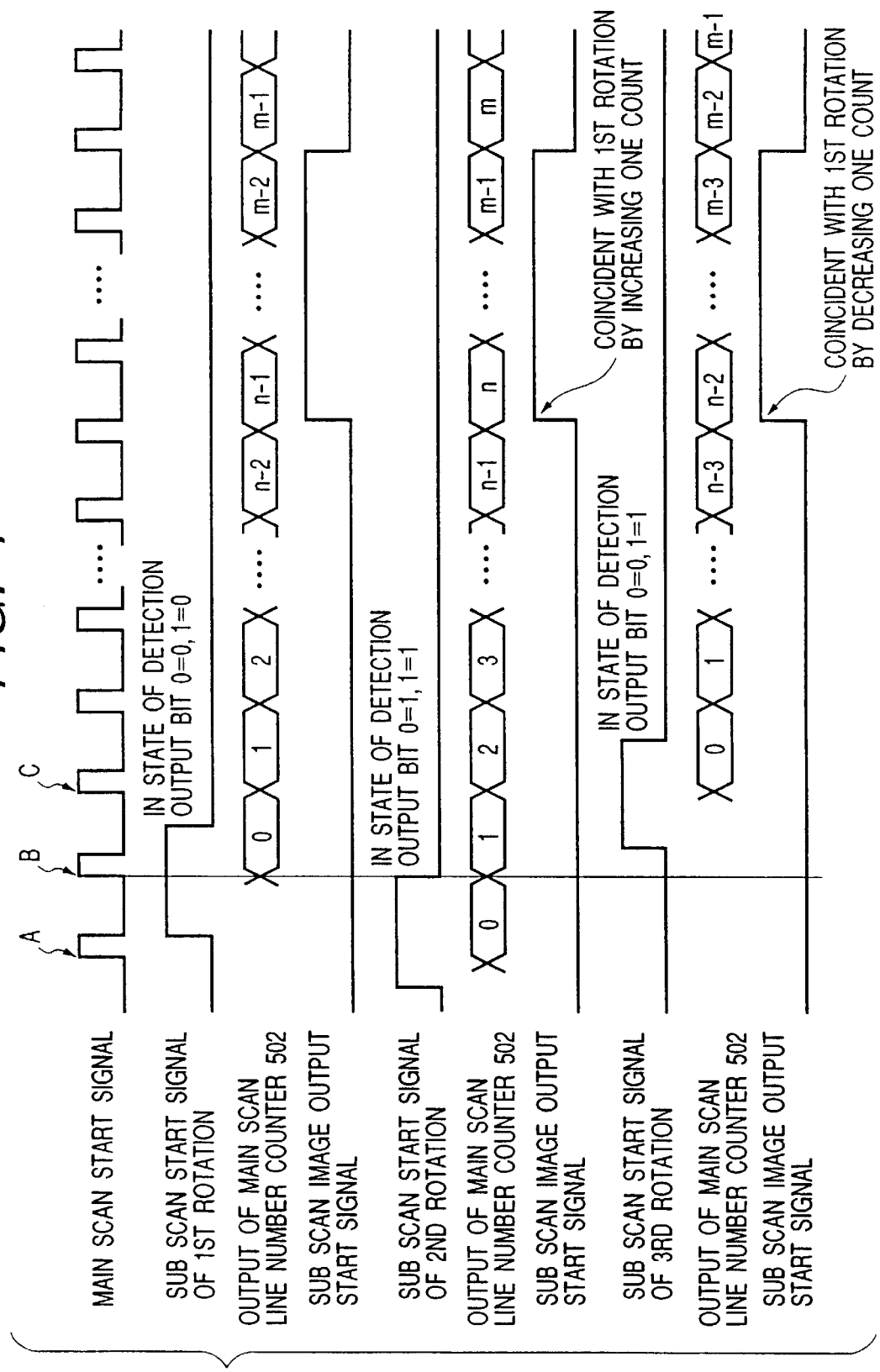
FIG. 7 is a timing chart showing the timing of starting the output of the sub scanning signal in the image forming apparatus of the present invention.

FIG. 7 is a timing chart showing the timing of starting the sub scanning image output in the image forming apparatus of the present invention.

Referring to FIG. 7, the sub scanning start signal for the first rotation is generated between the main scanning start signals A and B whereby the detection output (phase difference signal) of the phase difference detection circuit 122 has the bits 0 and 1 as the "0", so that the sub scanning image output start signal assumes the H-level while the output of the main scanning line number counter 502 remains within a range of (n–1) to (m–1).

The sub scanning start signal for the second rotation is generated before the main scanning start signal A whereby the detection output (phase difference signal) of the phase difference detection circuit 122 has the bits 0 and 1 as "1", so that the sub scanning image output start signal assumes the H-level while the output of the main scanning line number counter 502 remains with a range of (n) to (m).

The sub scanning start signal for the third rotation is generated after the main scanning start signal B whereby the detection output (phase difference signal) of the phase difference detection circuit 122 has the bit 0 as "0" and the bit 1 as "1", so that the sub scanning image output start signal assumes the H-level while the output of the main scanning line number counter 502 remains with a range of (n–2) to (m–2).

As shown in FIG. 7, the main scanning line number counter 502 executes counting, in the first rotation, from the main scanning start signal B, but, in the third rotation, executes a counting from the main scanning start signal C because the sub scanning start signal is generated after the main scanning start signal B, so that the count number is less by one count in comparison with that in the first rotation.

In this situation, the phase difference signal from the phase difference detection circuit 122 has the bit 0 as "0" and the bit 1 as "1" to select the inputs C of the selectors 503, 504 thereby reducing the main scanning line number count by one count to match the generating position of the sub scanning image output start signal with that in the first rotation.

In case the comparator 506 identifies the coincidence with the output from the selector 504, it resets the JKFF 507 thereby shifting the sub scanning image output start signal to the L-level (end of image output). Also this selector is controlled, like the selector 503, by the phase difference signal to switch the line number equal to, larger by a line or smaller by a line than in the first rotation, thereby matching the end position of the sub scanning image output start signal in the n-th rotation with that in the first rotation.

The sub scanning image output start signal is gated with the main scanning image output start signal generated in the sub scanning image output timing control unit 509 and the bits of the image data in the AND gate 508, whereby the image data are outputted as the laser driving data only in the image output area where the main and sub scanning image output start signals are both in the H-level.

As a result, on the photosensitive drum 105, the scanning line of the laser beam, based on the BD signal for the first scanning line in the first rotation overlaps with that of the first scanning line in the second rotation, whereby the scanning lines in the first and second rotations mutually overlap for each of 8193 BD signals.

It is thus rendered possible, by detecting the generating position of the ITOP signal within the period of the BD signal, detecting the phase difference from the generating position of the ITOP signal for example of the first color and accordingly controlling the count of the sub scanning line counter, to correct the color aberration of a line, resulting from a small aberration, within a line, caused by the fluctuation in the rotation of the drum motor 115 or by the backlash of the driving gears.

Since the phase difference between the ITOP signal and the BD signal is constant among different colors, it is possible, by starting the image writing from the ITOP signal, to exactly match the writing starting positions of the images of first to N-th colors, thereby obtaining an image of high quality without color aberration.

In the following there will be explained, with reference to a flow chart shown in FIG. 8, the image writing starting adjustment procedure in the image forming apparatus of the present invention.

Figure 8:
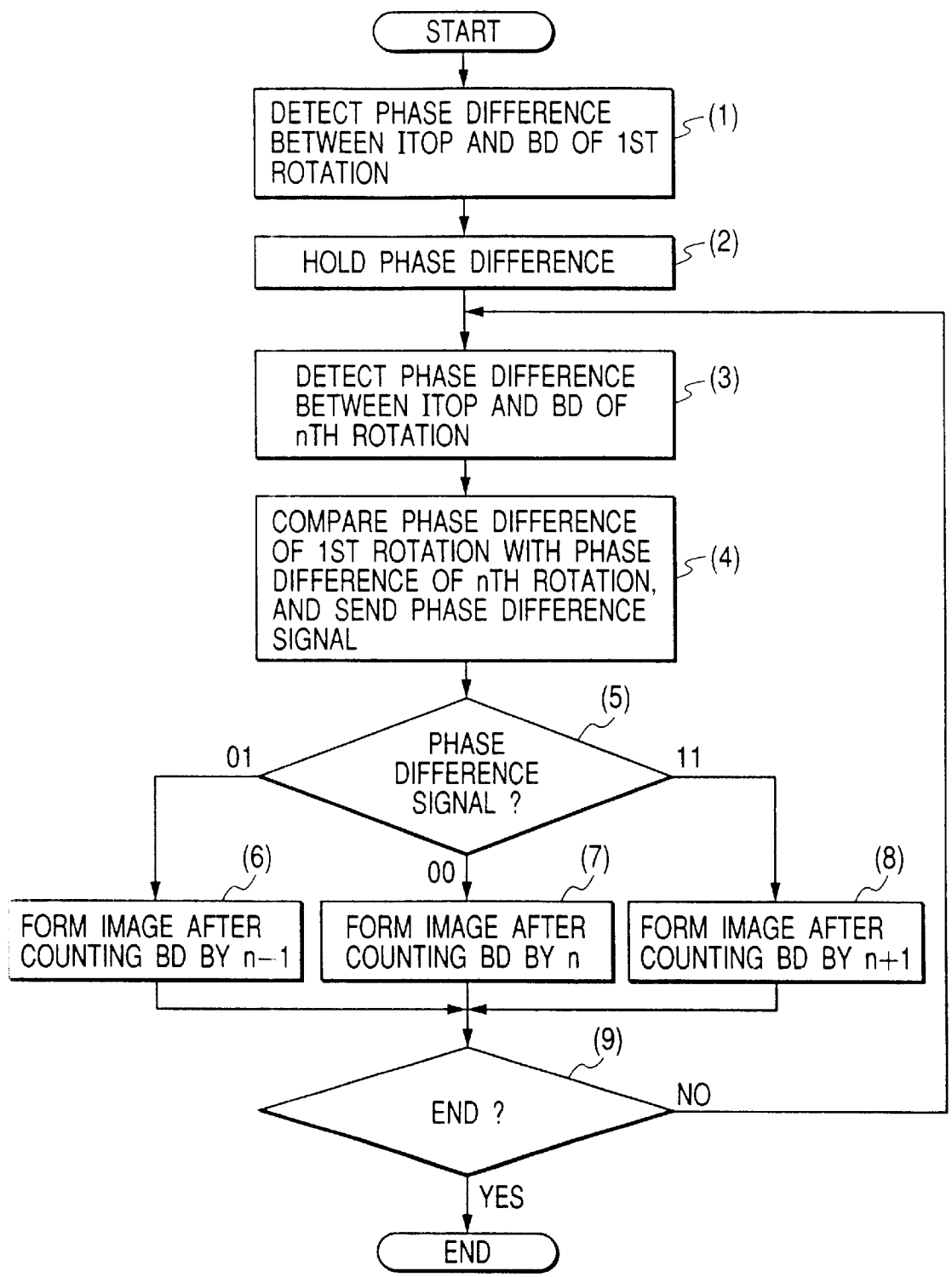
FIG. 8 is a flow chart showing an image writing adjustment sequence in the image forming apparatus of the present invention.
Figure 9A:
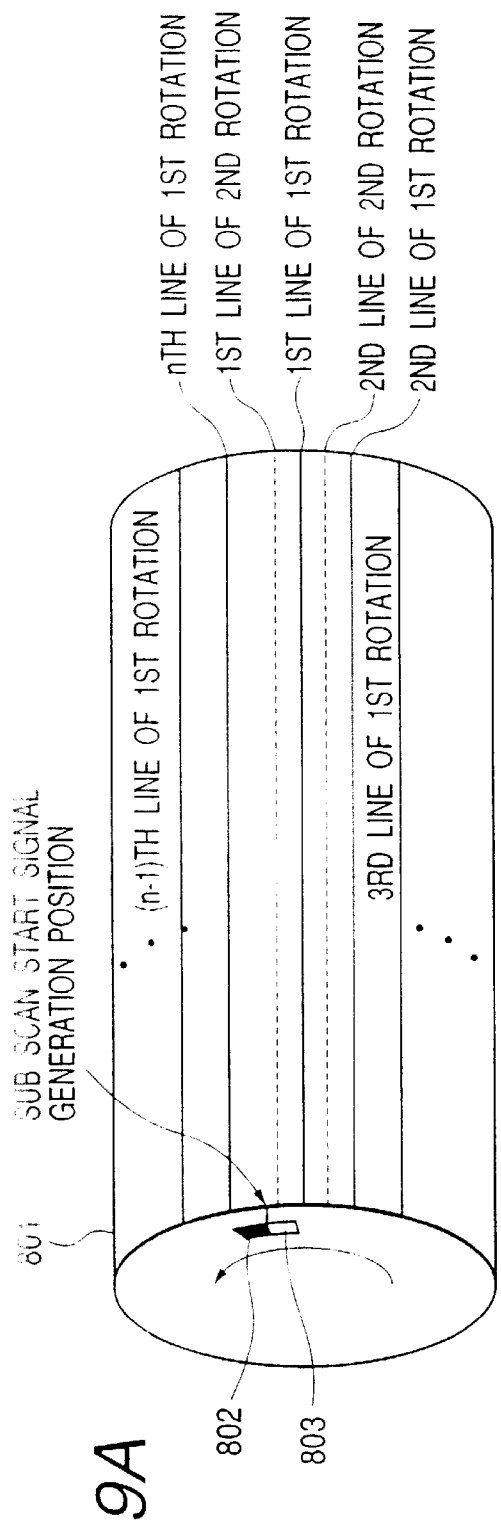
FIGS. 9A and 9B are schematic views showing the main scanning lines formed on the photosensitive member or the intermediate transfer member in a conventional image forming apparatus.
Figure 9B:
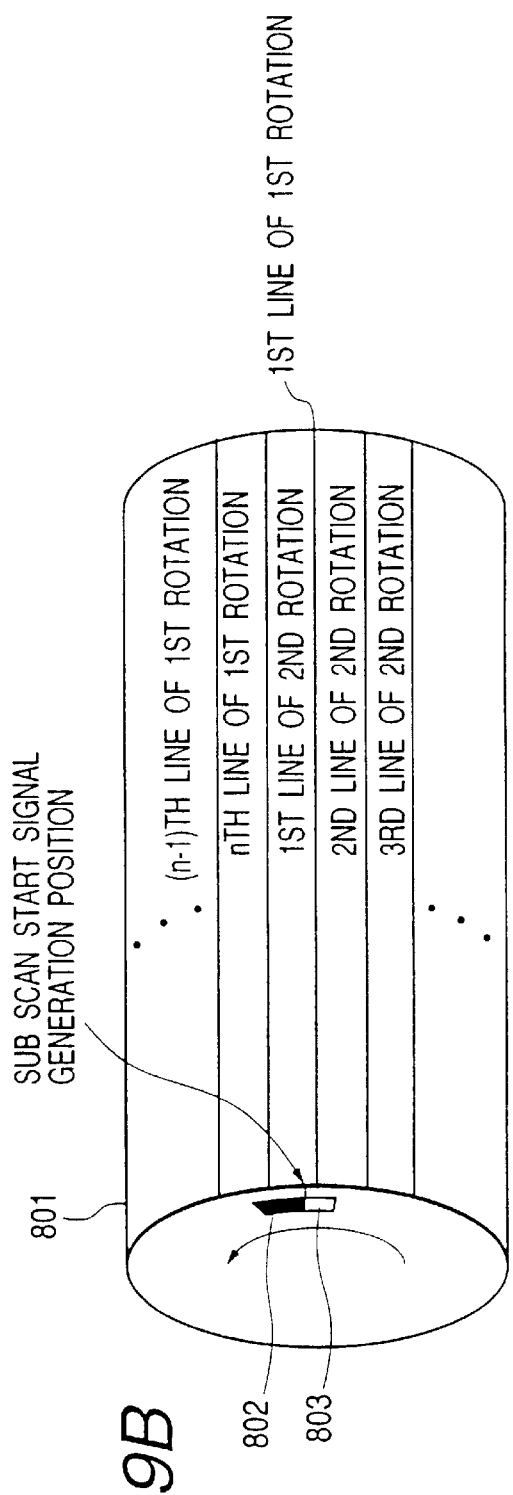
Figure 10:
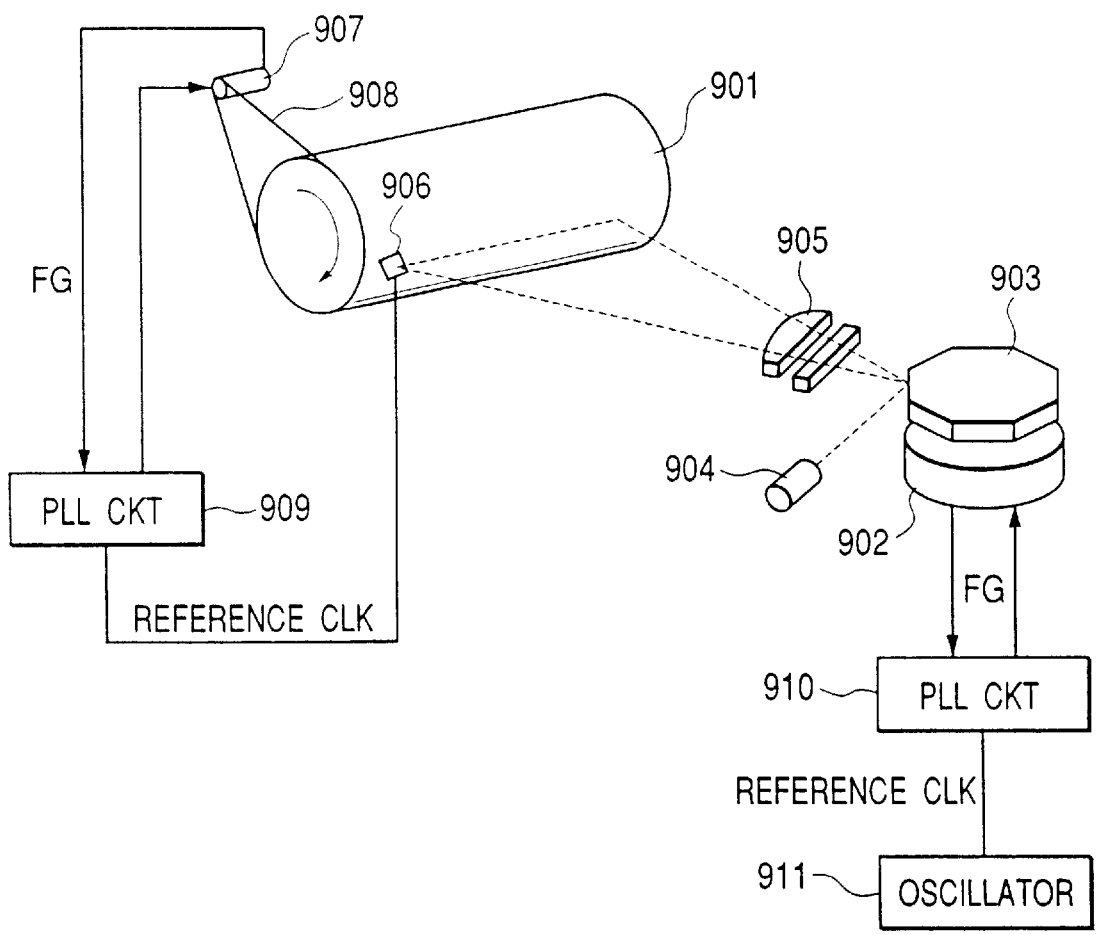
FIGS. 10, 11 and 12 are views showing the configuration of a conventional image forming apparatus.
Figure 11:
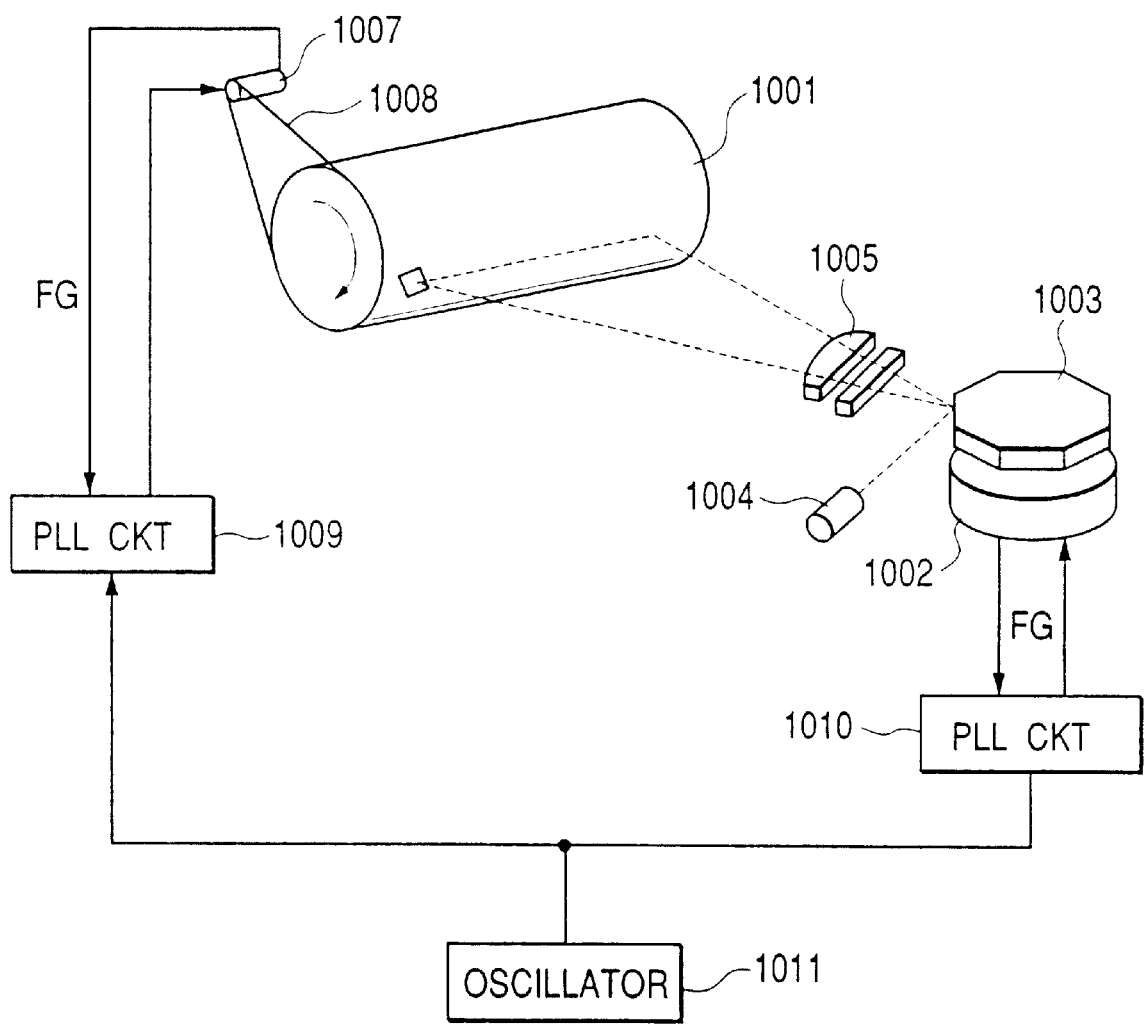
Figure 12:
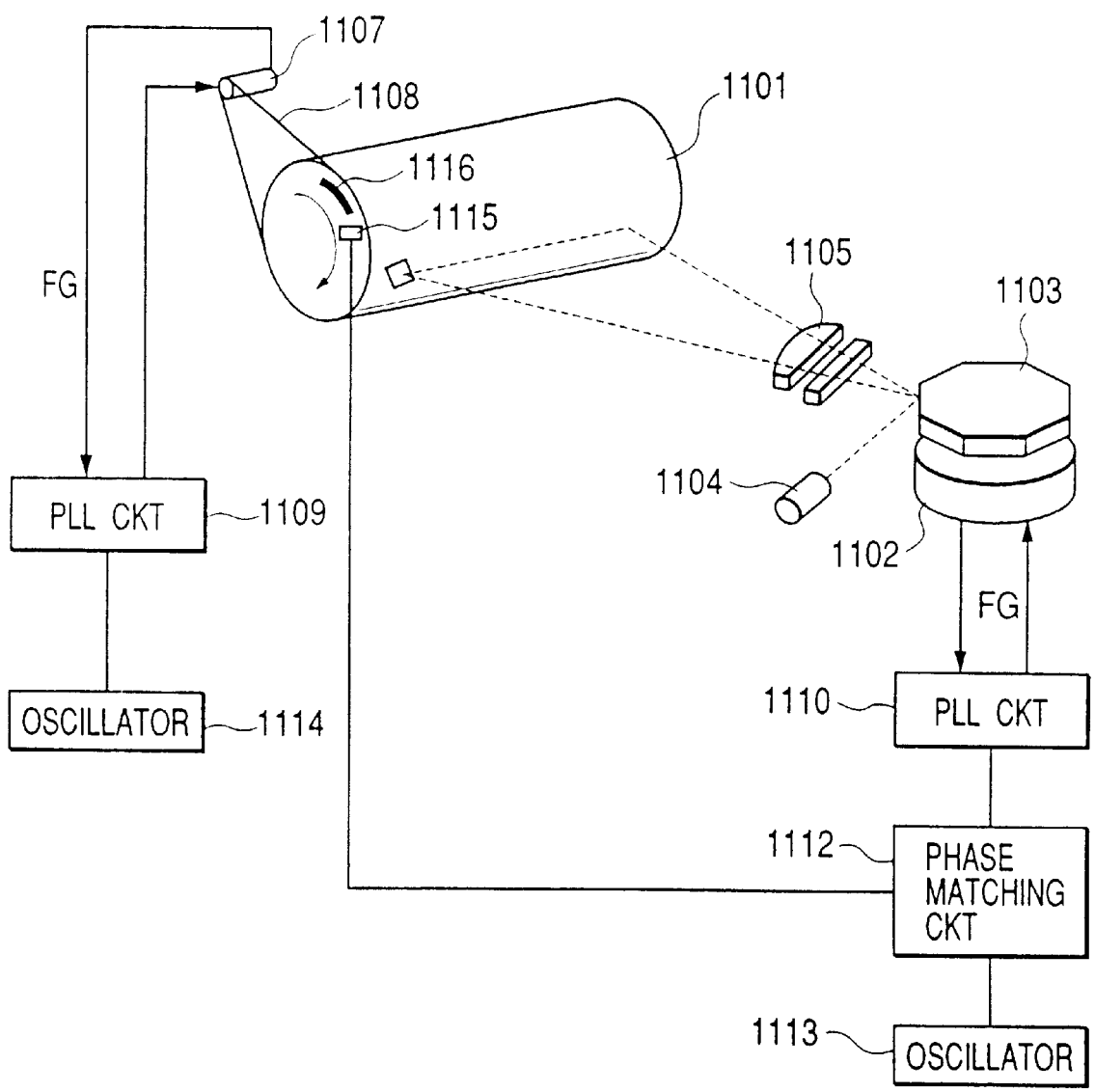
Figure 13:
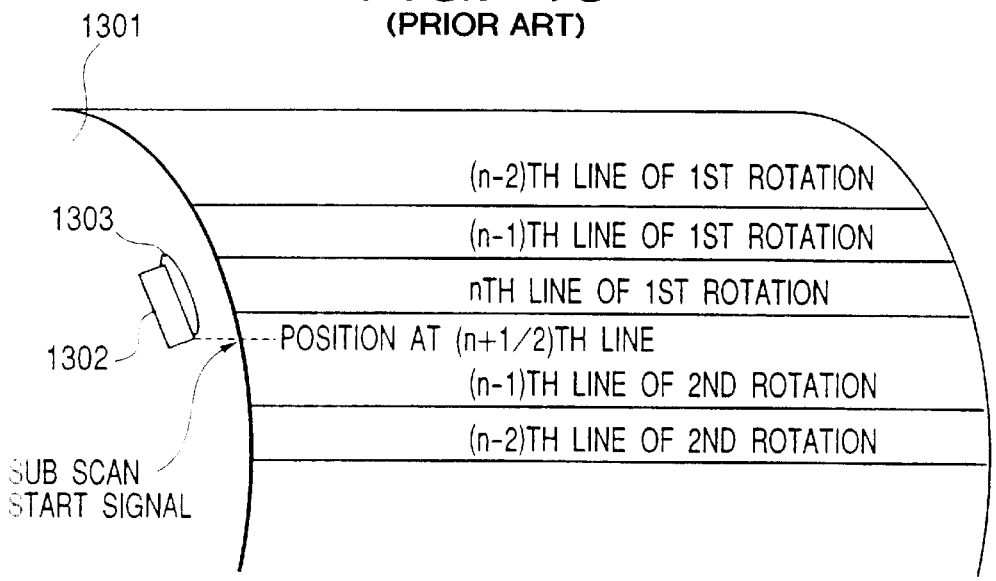
FIG. 13 is a schematic view showing the relationship between the actual main scanning lines (main scanning start signal) and the ITOP signal (sub scanning start signal) on the photosensitive member in the conventional image forming apparatus.
Figure 15:
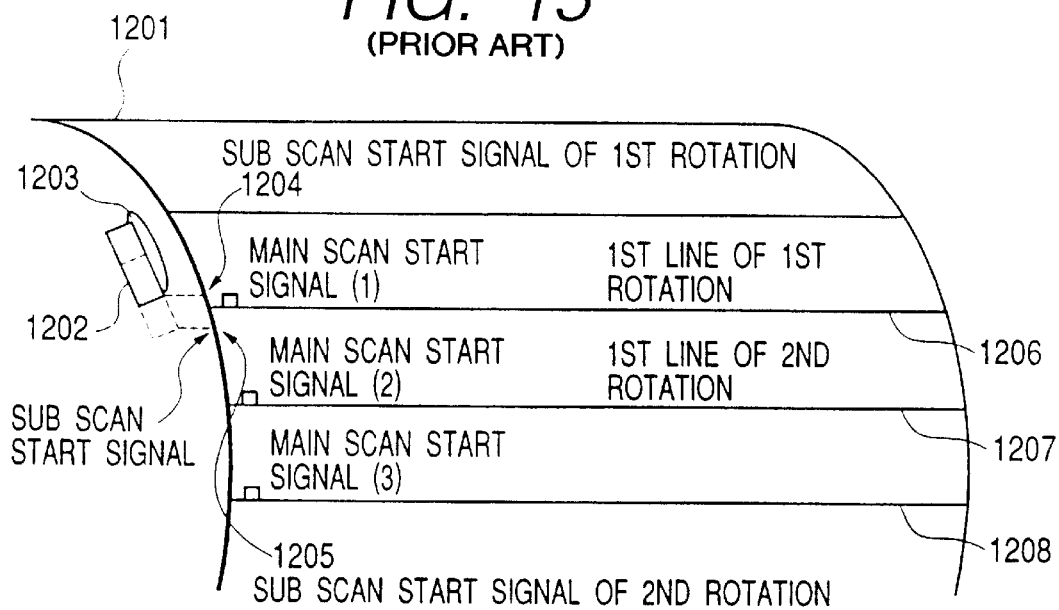
FIG. 15 is a schematic view showing the situation where the sub scanning start signals for the respective recording colors are generated across the main scanning start signal, in the conventional image forming apparatus.
Figure 14:
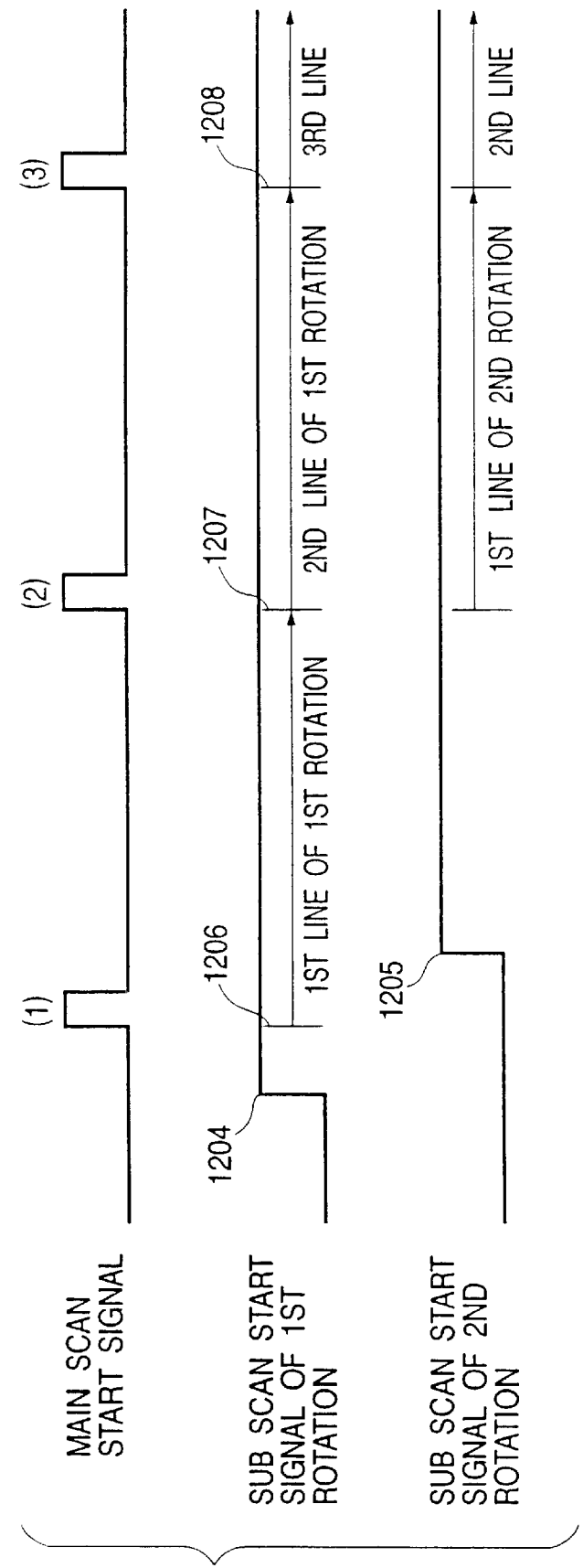
FIG. 14 is a timing chart showing the timing of image formation in the conventional image forming apparatus.
Figure 16:
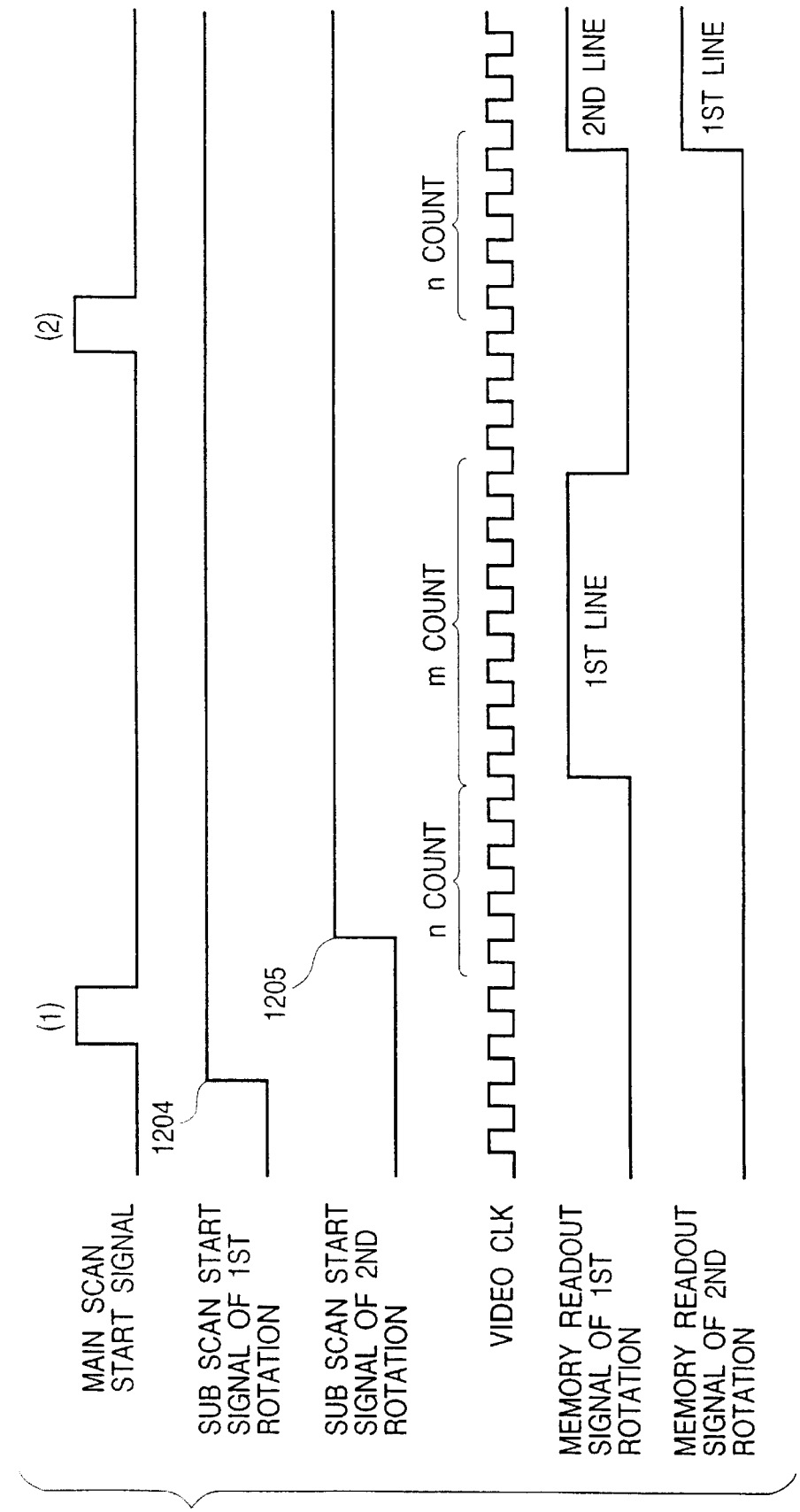
FIG. 16 is a timing chart showing the timing of image formation in the conventional image forming apparatus.

FIG. 8 is a flow chart showing the image writing starting adjustment sequence in the image forming apparatus of the present invention, wherein (1) to (8) indicate process steps.

When the image forming sequence is started, the latch circuit 604 detects, by the latch control signal from the CPU 130, the phase difference between the ITOP signal and the BD signal in the first rotation (1) and retains the detected phase difference (2).

The latch circuit 603 detects the phase difference between the ITOP signal and the BD signal in the n-th rotation (3). In the first rotation, the latch circuit 603 detects the phase difference between the ITOP signal and the BD signal in the first rotation, simultaneously with the detection by the latch circuit 604 of the phase difference between the ITOP signal and the BD signal in the first rotation in the step (1).

Then the comparators 606, 608 and the subtracter 609 compares the phase difference between the ITOP signal and the BD signal in the first rotation with that in the n-th rotation, and send the phase difference signal through the AND gate 609 to the image writing timing control circuit 101. Thus the image writing timing control circuit 101 receives, as the phase difference signal, the result of discrimination whether the ITOP signal for the n-th rotation is generated across the BD signal with respect to the ITOP signal in the first rotation (namely whether the ITOP signal for the n-th rotation is generated in a BD period different from that in which the ITOP signal for the first rotation is generated) (4).

Upon receiving the phase difference signal from the phase difference detection circuit, the image writing timing control circuit 101 discriminates whether the phase difference signal from the selectors 503, 504 is "01", "00" or "11" (5), and, in case of "01" (when the ITOP signal in the n-th rotation is generated later than that in the first rotation, across the BD signal), the comparators 505, 506 and the JKFF 507 output the sub scanning image output start signal after (n−1) count of the BD signal, thereby starting the image formation (6).

In case the step (5) identifies that the phase difference signals is "00" (when the ITOP signal in the n-th rotation is generated in a BD signal period same as that for the ITOP signal in the first rotation), the comparators 505, 506 and the JKFF 507 output the sub scanning image output start signal after (n) count of the BD signal, thereby starting the image formation In case the step (5) identifies that the phase difference signal is "11" (when the ITOP signal in the n-th rotation is generated earlier than the ITOP signal in the first rotation across the BD signal), the comparators 505, 506 and the JKFF 507 output the sub scanning image output start signal after (n+1) count of the BD signal, thereby starting the image formation (8).

Then there is discriminated whether the image forming sequence has been completed (9), and, if not, the sequence returns to the step (3) for detecting the phase difference of the ITOP signal and the BD signal in a next rotation, but, if completed, the sequence is terminated.

It is thus rendered possible to match the writing start position of each color with that of the first color without aberration in the timing of the sub scanning start signal, thereby obtaining an image of high quality without color aberration, by detecting the generating position of the ITOP signal within the BD signal period, detecting the phase difference from a reference generating position, for example the generating position of the ITOP signal for the first color, then discriminating whether the ITOP signal in the second or subsequent rotation is generated across the BD signal and, in case of generation across the BD signal, controlling the count value of the sub scanning line counters (input B for the comparators 505, 506).

The present embodiment has been explained by a case where the control corresponding to the above-described flow chart is realized by a hardware, but such control may naturally be realized by a software.

Second Embodiment

In the foregoing first embodiment, it is assumed that the fluctuation in the rotational phase of the photosensitive drum motor 115 and the scanner motor 106, caused for example by a variation in the load or by the backlash of the driving gears, it within ⅓ of the period of the BD signal. However, in case the fluctuation in the rotational phase of the photosensitive drum motor 115 and the scanner motor 106 is within 1/n of the period of the BD signal, the data set in B of the comparator 608 shown in FIG. 4 may be selected as 1/n of the period of the BD signal.

Thus the present invention is likewise applicable, with effects similar to those in the first embodiment, to a case where the fluctuation in the rotational phase of the photosensitive drum motor 115 and the scanner motor 106, resulting for example from the fluctuation in the load or from the backlash in the driving gears, is within 1/n of the period of the BD signal.

Third Embodiment

In the foregoing first embodiment, there has been explained a configuration where the main scanning start signal (BD signal) is subjected to frequency division to obtain the reference clock signal for the photosensitive drum motor 115 for driving the photosensitive drum 105, the transfer drum 108 and the intermediate transfer member, and the number of the main scanning start signal (BD signal) generated during a rotation of the photosensitive drum 105 or the transfer drum 108 and that of the main scanning line signal synchronized therewith become an integer. It is however possible also to synchronize the photosensitive drum 105, the transfer drum 108 and the intermediate transfer member with the scanner motor 106 by employing a common clock signal for the reference clock signal for the photosensitive drum motor 115 for driving the photosensitive drum 105, the transfer drum 108 and the intermediate transfer member and for the reference clock signal for the scanner motor 106 for controlling the main scanning operation.

The present invention may be applied in this manner to obtain effects similar to those in the first embodiment.

Fourth Embodiment

In the foregoing first embodiment, there has been explained a configuration where the main scanning start signal (BD signal) is subjected to frequency division to obtain the reference clock signal for the photosensitive drum motor 115 for driving the photosensitive drum 105, the transfer drum 108 and the intermediate transfer member, and the number of the main scanning start signal (BD signal) generated during a rotation of the photosensitive drum 105 or the transfer drum 108 and that of the main scanning line signal synchronized therewith become an integer. It is however possible also to synchronize the photosensitive drum 105, the transfer drum 108 and the intermediate transfer member with the scanner motor 106 by matching, at each generation of the sub scanning start signal (ITOP signal), the phase of the main scanning start signal (BD signal) with that of the sub scanning start signal.

The present invention may be applied in this manner to obtain effects similar to those in the first embodiment.

Fifth Embodiment

In the foregoing first embodiment, there has been explained a configuration of controlling the count of the generating position of the ITOP signal based on the phase difference of the ITOP signal detected by the phase difference detection circuit 122, in the image forming apparatus in which a sub scanning start signal (ITOP signal) is generated for a rotation of the photosensitive drum 105, the transfer drum 108 or the intermediate transfer member. It is however also possible, in an image forming apparatus capable of generating plural sub scanning start signals (ITOP signals) for a rotation of the photosensitive drum 105 and of executing formation of plural latent images and transfer of plural images in a rotation thereof, that the phase difference detection circuit 122 are provided independently for the respectively ITOP signals the image writing timing control circuit 101 controls the count indicating the generating position of the ITOP signal based on the phase difference detected for each ITOP signal.

Thus, even in case forming plural latent images and transferring plural images in a rotation of the photosensitive drum, it is rendered possible to exactly match the writing start position of the images from the first color to the N-th color, thereby obtaining an image of high quality without color aberration.

Also in the first embodiment, the sub scanning start signal (ITOP signal) is generated by the ITOP sensor 110 by detecting the flag 111 fixed in the transfer drum, but there may be provided a timer unit for measuring the period of the photosensitive drum or the transfer drum and the sub scanning start signal (ITOP signal) may be generated according to the time measurement by such timer unit.

As explained in the foregoing, even in case the fluctuation in the relative timing of generation of the sub scanning start signal and the main scanning start signal from the theoretical value cannot be avoided by the mechanical technology for preventing the positional aberration, for example the rotation speed of the photosensitive member etc. fluctuates by the influence of the variation in the load or by the backlash of the driving gears, it is rendered possible to match the writing start position for each color with that for the first color on the recording sheet, without aberration in the timing of the sub scanning start signal, thereby obtaining an image of high quality without color aberration, by detecting the generating position of the ITOP signal within the period of the BD signal, detecting the phase difference from a reference generating position such as the generating position of the ITOP signal for the first color and accordingly controlling the count (input B of the comparators 505, 506) of the sub scanning line counter.

Sixth Embodiment

Figure 17:
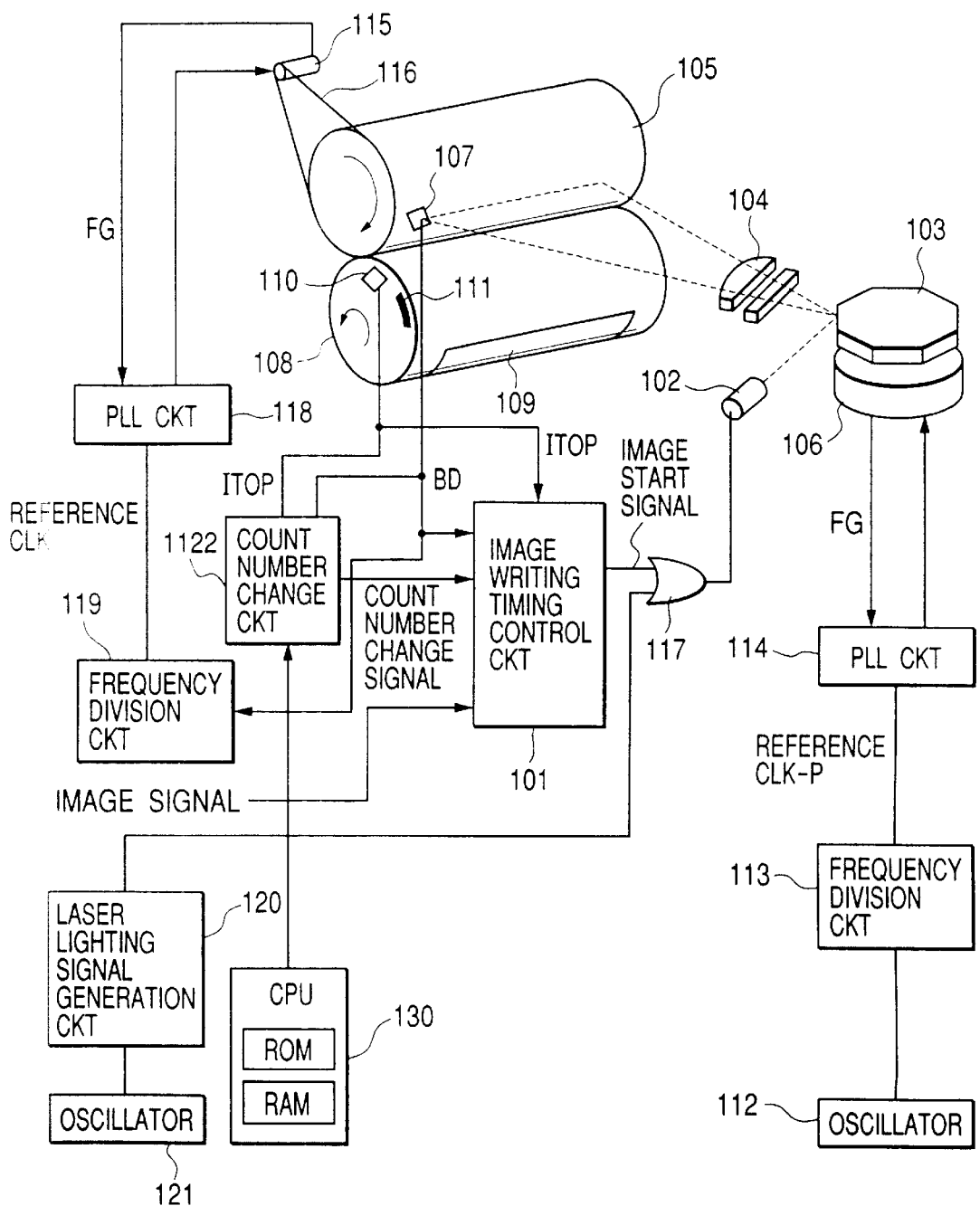
FIG. 17 is a view showing the configuration of a printer unit in the image forming apparatus shown in FIG. 1.

FIG. 17 shows the configuration of the printer unit 200 in the image forming apparatus shown in FIG. 1, where in the components same as those in FIG. 1 are represented by same numbers.

Referring to FIG. 17, an oscillator 112 generates a clock signal of a predetermined frequency. A frequency division circuit 113 divides the frequency of the clock signal from the oscillator 112 with a predetermined frequency division ratio, thereby generating a polygonal motor driving pulse signal (reference CLK-P signal). A PLL circuit 114 detects the phase difference and the frequency deviation between a motor FG pulse signal generated by the rotation of the polygonal motor 106 and the reference CLK-P signal and executes PLL control on the driving voltage to the polygonal motor 106 in such a manner that these signals are matched in phase.

An oscillator 121 generates a clock signal of a predetermined frequency. A laser lighting signal generation circuit 120 receives the clock signal from the oscillator 121 and the BD signal from a BD sensor 107 and generates a laser lighting signal for BD signal detection. A count number changing circuit 1122 receives the ITOP signal from the ITOP sensor 110, the BD signal from the BD sensor 107 and a latch control signal from a CPU 130 detects the phase difference between the BD signal and the ITOP signal and generates a count number changing signal based on the result of phase difference detection.

An image writing timing control circuit 101 receives the ITOP signal from the ITOP sensor 110 and the BD signal from the BD sensor 107, counts the BD signal by a predetermined number n after the detection of the leading edge of the ITOP signal, generates an image start signal in synchronization with the leading edge of the n-th BD signal and outputs the image signal at the timing of such sub scanning start signal. The sub scanning start signal is outputted corresponding to BD signals of m counts, determined by the length of the recording sheet. The image writing timing control circuit 101 also receives a count number changing signal from the count number changing circuit 1122 and changes the count n of the BD signal by a predetermined number, thereby controlling the timing of generation of the sub scanning start signal.

An OR gate 117 sends the image signal from the image writing timing control circuit 101 or the laser lighting signal for the BD signal detection from the laser lighting signal generation circuit 120, thereby modulating the semiconductor laser 102.

A frequency division circuit 119 divides the frequency of the BD signal from the BD sensor 107 with a predetermined frequency division ratio, thereby generating a photosensitive drum motor driving pulse signal (reference CLK signal). A PLL circuit 118 detects the phase difference and the frequency deviation between the motor GF pulse signal generated by the rotation of the photosensitive drum motor 115 and the reference CLK signal and effects PLL control for controlling the driving voltage to the photosensitive drum motor 115 in such manner that these signals mutually match in phase. A CPU 130 is provided with a RAM and a ROM therein and controls the entire image forming apparatus according to a program stored in the ROM.

In the following there will be explained the functions of the various units.

The image writing timing control circuit 101 receives the image signal transferred from the scanner unit 201 shown in FIG. 1 or from the external device such as an unrepresented computer through certain communication medium, and modulates the semiconductor laser 102 through the OR gate 117 according the image signal of magenta, cyan, yellow or black. The laser beam is reflected by the polygonal mirror 103, then subjected to f-θ correction by the f-θ lens 104 and further reflected by the mirror 216 (shown in FIG. 1) to scan the photosensitive drum 105 thereby forming an electrostatic latent image thereon.

The polygonal motor 106 is driven by the polygonal motor driving pulse signal (reference CLK-P signal) generated in the frequency division circuit 113 by dividing the frequency of the clock signal from the oscillator 112 and supplied to the PLL circuit 114. The PLL circuit 114 detects the phase difference and the frequency deviation between the motor FG pulse signal from the polygonal motor 106 and the reference CLK-P signal and effects PLL control for controlling the driving voltage to the polygonal motor 106 in such a manner that these signals mutually match in phase.

The BD sensor 107 positioned in the vicinity of the scanning start position of the laser beam in a scanning line detects the line scanning of the laser beam and generates the scanning start reference signal (BD signal) for the lines of a same cycle as shown in FIG. 3. Also the ITOP sensor 110 provided in the transfer drum 108 detects the flag 111 fixed therein along the rotation thereof to generate the ITOP signal (indicating the top position of the recording sheet 109 on the transfer drum 108) as explained with reference to FIG. 3. Also the photosensitive drum motor 115 is driven by the motor driving pulse signal (reference CLK signal) obtained by dividing, in the frequency division circuit 119, the frequency of the laser light signal for BD signal detection from the laser lighting signal generation circuit 120 and supplied to the PLL circuit 118.

The PLL circuit 118 detects the phase difference and the frequency deviation between the motor FG pulse signal from the photosensitive drum motor 115 and the reference CLK signal and effects PLL control for controlling the driving voltage to the photosensitive drum motor 115 in such a manner that these signals mutually match in phase. The photosensitive drum 105 is rotated in a direction indicated by an arrow, by the photosensitive drum motor 115 through a gear belt 116 and the transfer drum 108 is rotated in a direction indicated by an arrow (sub scanning direction) at a same speed as that of the photosensitive drum 105, as it is coupled with the photosensitive drum 105 through unrepresented gears. The BD signal and the ITOP signal are supplied to the image writing timing control circuit 101 for sending the image signal to the semiconductor laser 102 at a timing to be explained in the following. After the detection of the leading edge of the ITOP signal, the image writing timing control circuit 101 counts the BD signal by a predetermined number n, and generates the sub scanning start signal (for a duration of BD signal of m counts determined by the length of the recording sheet) in synchronization with the leading edge of the n-th BD signal, thereby irradiating the photosensitive drum 105 with the laser beam modulated with the image signal.

Figure 18:
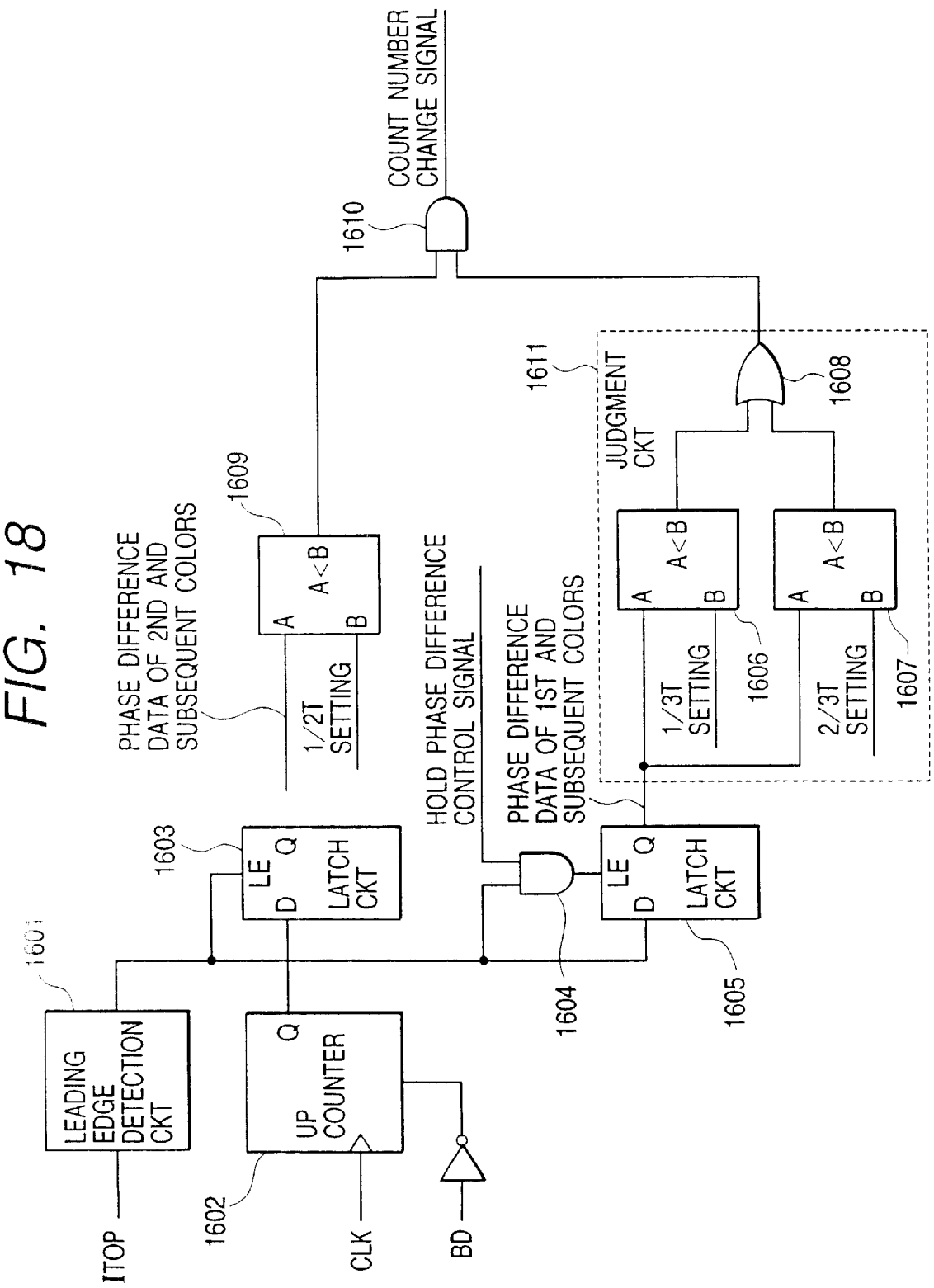
FIG. 18 is a circuit diagram showing the configuration of a count number changing circuit shown in FIG. 17.

FIG. 18 is a block diagram showing the configuration of the count number changing circuit 1122 shown in FIG. 17.

Referring to FIG. 18, a leading edge detection circuit 1601 detects the leading edge of the ITOP signal generated by the ITOP sensor 110 in the transfer drum 108. An up counter 1602 consists of a free-run counter which is cleared to zero by the BD signal and repeats the up counting operation, and the count of this counter determines the period of the BD signal.

A latch circuit 1603 latches the output of the up-counter 1602 at the output timing of the leading edge detection circuit 1601. The latched count indicates the leading edge position of the ITOP signal in the period of the BD signal, thus indicating the phase difference between the ITOP signal and the BD signal.

A latch circuit 1605 latches the output of the up-counter 1602, like the latch circuit 1603, when the output of the leading edge detection circuit 1601 and the latch control signal from the CPU 130 shown in FIG. 17 are received through an AND gate 1604.

The CPU 130 shown in FIG. 17 maintains the latch control signal at the H-level only during the output of the image data of the first color but fixes it at the L-level during the output of the second and subsequent colors. Thus the count latched in the latch circuit 1603 indicates the leading edge position of the ITOP signal in the period of the BD signal for the second and subsequent colors, while the count latched in the latch circuit 1604 indicates the leading edge position of the ITOP signal in the period of the BD signal for the first color. Thus the output of the latch circuit 1605 indicates the phase difference between the ITOP signal and the BD signal in the first rotation, while the output of the latch circuit 1603 indicates the phase difference between the ITOP signal and the BD signal in the n-th rotation.

A comparator 1606 compares the phase difference data between the ITOP signal and the BD signal in the first rotation, outputted from the latch circuit 1605 with ⅓ of the period T of the BD signal, and supplies an OR gate 1608 with an H-level signal in case the phase difference between the ITOP signal and the BD signal in the first rotation is smaller than ⅓ of the BD signal period, but an L-level signal otherwise.

A comparator 1607 compares the phase difference between the ITOP signal and the BD signal in the first rotation (first color) outputted from the latch circuit 1605 with ⅔ of the period T of the BD signal, and outputs an H-level signal in case the phase difference in the first rotation is larger than ⅔ of the period T of the BD signal but an L-level signal otherwise.

A discrimination circuit 1611 is composed of the comparators 1606, 1607 and the OR gate 1608 and provides an AND gate 1810 with an H-level signal in case the phase difference between the ITOP signal and the BD signal in the first rotation (first color) is smaller than ⅓ or larger than ⅔ of the period T of the BD signal but an L-level signal otherwise. Thus the output of the discrimination circuit 1611 assumes the H-level in case the ITOP signal in the first rotation is generated output a predetermined area in the period of the BD signal, but it assumes the L-level in case the ITOP signal is generated within the predetermined area in the period of the BD signal.

A comparator 1609 compares the phase difference between the ITOP signal and the BD signal in the n-th rotation (n-th color) outputted from the latch circuit 1603 with ½ of the period T of the BD signal, and supplies an AND gate 1610 with an H-level signal in case the phase difference between the ITOP signal and the BD signal in the first rotation is larger than ½ of the period T of the BD signal but an L-level signal otherwise. More specifically, when the ITOP signal in the n-th rotation is generated in the former half of the period of the BD signal, the output of the comparator 1609 assumes the H-level, but, it assumes the L-level in case the ITOP signal in the n-th rotation is generated in the latter half of the period of the BD signal.

The AND gate 1610 issues the H-level signal in case the phase difference between the ITOP signal and the BD signal in the n-th rotation (n-th color) is smaller than ½ of the period T of the BD signal and the phase difference between the ITOP signal and the BD signal in the first rotation (first color) is outside the predetermined range (smaller than ⅓ or larger than ⅔ of the period T of the BD signal) but issues the L-level signal otherwise. Thus the H-level output of the count number changing circuit 122 indicates that the ITOP signal in the first rotation is generated outside the predetermined range in the period of the BD signal and the ITOP signal in the current n-th rotation is generated in the former half of the period of the BD signal.

The values ⅓ and ⅔ of the period T of the BD signal set in the comparators 1606, 1607 are merely an example in the present embodiment, applicable to a case where the fluctuation in the phase difference between the main scanning start signal and the sub scanning start signal, caused by a fluctuation in the rotation speed of the photosensitive member under the aforementioned influence of the variation in the load or the backlash in the driving gears, is within ⅓ of the period T of the BD signal. In case such phase difference is within 1/n of the period T of the BD signal, (⅓)T is changed to (1/n)T while (⅔)T is changed to ((n−1)/n)T.

Figure 19A:
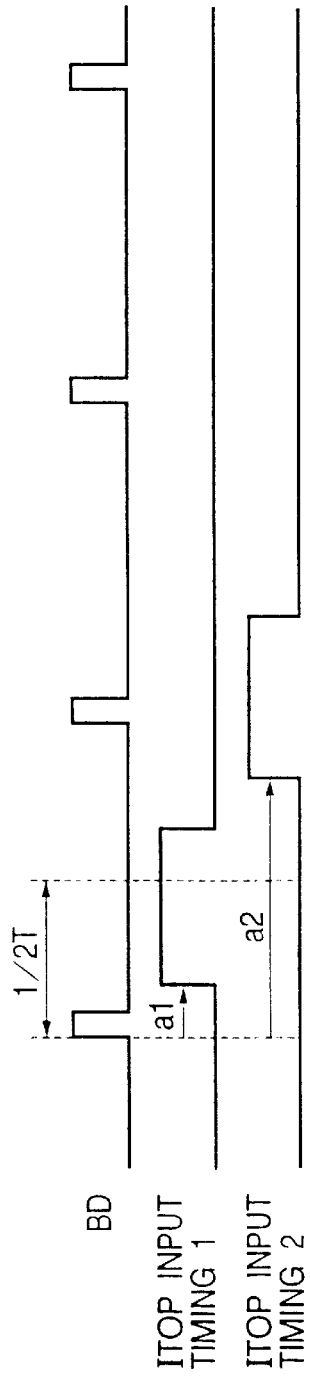
FIGS. 19A and 19B are timing charts showing the timing of generation of the main scanning signal and the sub scanning signal in the image forming apparatus of the present invention.
Figure 19B:
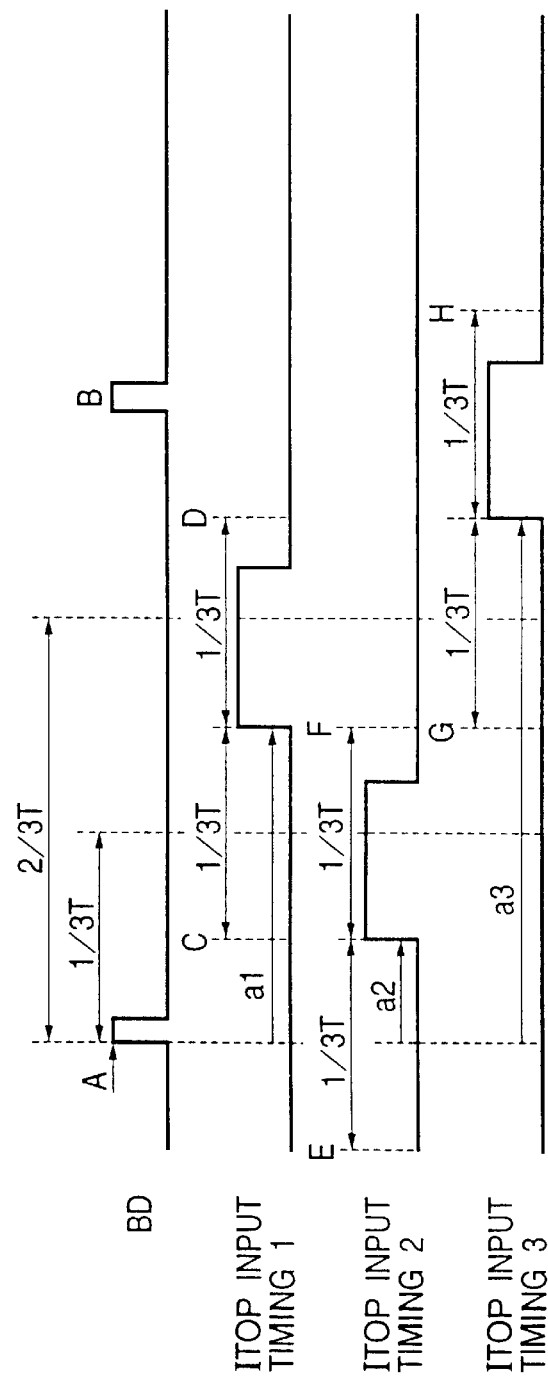

FIGS. 19A and 19B are timing charts showing the timing of generation of the main scanning signal and the sub scanning signal in the image forming apparatus of the present invention.

Referring to FIG. 19A, an ITOP signal input timing 1 corresponds to a case where the ITOP signal is generated in the former half of the period of the main scanning start signal (BD signal), and the phase difference a1 between the ITOP signal and the BD signal is smaller than ½ of the period T of the BD signal (a1<(½)T) so that the output of the comparator 1609 assumes the H-level. Also an ITOP signal input timing 2 corresponds to a case where the ITOP signal is generated in the latter half of the period of the main scanning start signal (BD signal), and the phase difference a1 between the ITOP signal and the BD signal is larger than ½ of the period T of the BD signal (a1>(½)T) so that the output of the comparator 1609 assumes the L-level.

Thus, the output of the comparator 1609 assumes the H- or L-level respectively in case the ITOP signal is generated in the former or latter half of the period of the BD signal.

Referring to FIG. 19B, the BD signal is generated at a constant interval with a period T. An ITOP signal input timing 1 corresponds to a case where the main scanning start signal (BD signal) is generated at the approximate center of the period of the main scanning start signal, and the phase difference a1 between the ITOP signal and the BD signal is larger than ⅓ but smaller than ⅔ of the period T of the BD signal ((⅓)T<a1<(⅔)T), so that the output of the discriminating circuit 1611 assumes the L-level.

If the fluctuation in the phase difference between the main scanning start signal and the sub scanning start signal is assumed to be within (⅓)T, the ITOP signal input timing for the second, third, . . . , n-th rotations, even with a deviation of (⅓)T to the earlier or later side at maximum, falls within the areas C, D and does not go beyond the BD signal A or B.

Then, the ITOP signal input timing 2 corresponds to a case where the main scanning start signal (BD signal) is generated close to the start of the period of the main scanning start signal, and the phase difference a2 between the ITOP signal and the BD signal is smaller than ⅓ of the period T of the BD signal (a2<(⅓)T), so that the output of the discriminating circuit 1611 assumes the H-level. If the fluctuation in the phase difference between the main scanning start signal and the sub scanning start signal is assumed to be within (⅓)T, the ITOP signal input timing for the second, third, . . . , n-th rotations under a deviation of (⅓)T to the earlier or later side at maximum falls within the areas E, F and does not go beyond the BD signal B but may go beyond the BD signal A in case of the area E.

Then, the ITOP signal input timing 3 corresponds to a case where the main scanning start signal (BD signal) is generated close to the end of the period of the main scanning start signal, and the phase difference a3 between the ITOP signal and the BD signal is larger than ⅔ of the period T of the BD signal (a3>(⅔)T), so that the output of the discriminating circuit 1611 assumes the H-level. If the fluctuation in the phase difference between the main scanning start signal and the sub scanning start signal is assumed to be within (⅓)T, the ITOP signal input timing for the second, third, . . . , n-th rotations under a deviation of (⅓)T to the earlier or later side at maximum falls within the areas G, H and does not go beyond the BD signal A but may go beyond the BD signal B in case of the area H.

Thus the output of the discrimination circuit 1611 assumes the H- or L-level respectively in case the ITOP signal may be generated across the BD signal or not.

FIG. 20 is a block diagram showing the configuration and function of the image writing timing control circuit 101 shown in FIGS. 19A and 19B.

Referring to FIG. 20, an ITOP signal leading edge detection circuit 1501 detects the leading edge of the ITOP signal to load data in a main scanning line number counter 1503 and sets a JK flip-flop (JKFF) 1502, thereby enabling the function of a main scanning line number counter 1503 which counts the number of main scanning start signal (BD signal).

The count output of the main scanning line number counter 1503 is supplied to comparators 1507, 1506. The comparator 1507 discriminates the coincidence with the output from a selector 1504, and, in case of coincidence, sets a JK flip-flop (JKFF) 1508 for setting the sub scanning image output start signal at the H-level (start of image output). The comparator 1506 discriminates the coincidence with the output from a selector 1505, and, in case of coincidence, resets the JKI flip-flop (JKFF) 1508 for setting the sub scanning image output start signal at the L-level (end of image output).

In the selector 1504, an input A is the position for generating the standard sub scanning image output start signal, for generating the sub scanning image output start signal at the n-th line from the reception of the main scanning start signal (ITOP signal). An input B is the position for generating the sub scanning image output start signal less by a line than in the standard condition, for generating the sub scanning image output start signal at he (n−1)th line after the reception of the main scanning start signal (ITOP signal).

In the selector 1505, an input A is the position for generating the standard sub scanning image output end signal (standard setting), for shifting the sub scanning image output start signal to the L-level at the m-th line from the reception of the main scanning start signal (ITOP signal). An input B is the position for generating the sub scanning image output start signal less by a line than in the standard condition, for shifting the sub scanning image output start signal to the L-level at the (m−1)th line after the reception of the main scanning start signal (ITOP signal).

The switching operation of the selectors 1504, 1505 is controlled by the output from the count number changing circuit 122. In case the ITOP signal cannot be generated across the BD signal, or in case the ITOP signal may be generated across the BD signal but only in the latter half of the period of the BD signal, there is selected a setting where the count number changing signal assumes the L-level to select the inputs A and B for shifting the sub scanning image output start signal to the H-level at the n-th line and to the L-level at the m-th line.

On the other hand, in case the ITOP signal may be generated across the BD signal and is generated in the former half of the period of the BD signal, there is selected a setting where the count number changing signal assumes the H-level to select the input B for shifting the sub scanning image output start signal to the H-level at the (n−1)th line and to the L-level at the (m−1)th line.

An AND gate 1509 effects gating operation on the main scanning image output start signal and the sub scanning image output start signal from the JKFF 1508, and outputs the image data as the laser driving data only in the image output area when the main and sub scanning image out start signals both at the H-level.

In the following the above-described functions will be explained in detail with reference to timing charts shown in FIGS. 21A to 21C.

FIGS. 21A to 21C are timing charts showing the timing of generation of the main scanning signal and the sub scanning signal in the image forming apparatus of the present invention.

FIG. 21A shows a case where the sub scanning start signal (ITOP signal) in the first rotation is generated at the approximate center of the period of the main scanning start signal (BD signal), while FIG. 21B shows a case where the sub scanning start signal of the first rotation is generated close to the start of the period of the main scanning start signal, and FIG. 21C shows a case where the sub scanning start signal of the first rotation is generated close to the end of the period of the main scanning start signal. In the present embodiment the phase difference between the ITOP signal and the BD signal is assumed to be within ⅓ of the period T of the BD signal.

Referring to the case of FIG. 21A where the sub scanning start signal of the first rotation is generated at the approximate center of the period of the main scanning start signal, the sub scanning starting signal of the n-th rotation is generated in a broken-lined D in FIG. 21A (range of (⅓)T before and after the sub scanning start signal A1 of the first rotation). Therefore, in any of the first to n-th rotations, the counter 1503 starts the counting operation after n count from the timing of the BD signal (1).

The generation phase A1 of the ITOP signal of the first rotation is contained within a range of (⅓)T to (⅔)T (phase difference a1 of ITOP signal and BD signal satisfies a relationship (⅓)T<a1<(⅔)T), so that the discrimination circuit 1611 shown in FIG. 18 provided an L-level output. Since the output of the discrimination circuit 1611 retains the phase data of the first rotation by the holding control signal from the CPU 130 shown in FIG. 17, it is maintained at the L-level unless the data of the first rotation is latched again.

For this reason the count number changing signal outputted from the AND gate 1610 assumes the L-level, so that the selectors 1504, 1505 shown in FIG. 20 always select "n" and "m" respectively, in the first to n-th rotations. Therefore the fluctuation in the image writing start position can be suppressed to the phase aberration between the ITOP signal and the BD signal.

In the case shown in FIG. 21B where the sub scanning start signal of the first rotation is generated close to the start of the period of the main scanning start signal, the sub scanning start signal of the n-th rotation is generated in a range of (⅓)T before and after the sub scanning start signal A1 of the first rotation, so that it may be generated across the main scanning start signal.

In this case, the generation phase A1 of the ITOP signal of the first rotation is not contained in the range of (⅓)T to (⅔)T (phase difference a1 between the ITOP signal and the BD signal is represented by a1<(⅓)T), so that the discrimination circuit 1611 shown in FIG. 18 provides an H-level output. Since the output of the discrimination circuit 1611 retains the phase data of the first rotation by the holding control signal from the CPU 130 shown in FIG. 17, it is maintained at the H-level unless the data of the first rotation is latched again.

With regard to the input phase A1 of the ITOP signal of the first rotation and that Am of the ITOP signal of the n-th rotation, since the phase differences a1, am of the ITOP signal and the BD signal satisfy relations a1<(½)T and am<(½)T, the comparator 1609 provides an H-level output while the count number changing signal assumes the H-level so that the selectors 1504, 1505 shown in FIG. 20 respectively select "n−1" and "m−1". Thus the n counting operation is started from an immediately preceding BD signal with a count decreased by one, so that the counting operation is started at a timing (1).

With regard to the input phase An of the ITOP signal of the n-th rotation, since the phase differences an of the ITOP signal and the BD signal satisfies a relation an >(½)T, the count number changing signal assumes the L-level so that the selectors 1504, 1505 shown in FIG. 20 respectively select "n" and "m". Thus the count numbers are not changed and the counting operation is started at the timing (1). The counter 1503 in FIG. 20 starts the counting operation from the timing (1) of the BD signal in all the first to n-th rotations. Thus, by starting the counting operation from the BD signal closest to the input of the ITOP signal, the fluctuation in the image writing start position can be suppressed to the phase difference between the ITOP signal and the BD signal.

In the case shown in FIG. 21C where the sub scanning start signal of the first rotation is generated close to the end of the period of the main scanning start signal, the sub scanning start signal of the n-th rotation is generated in a range of (⅓)T before and after the sub scanning start signal A1 of the first rotation, so that it may be generated across the main scanning start signal.

In this case, the generation phase A1 of the ITOP signal of the first rotation is not contained in the range of (⅓)T to (⅔)T (phase difference a1 between the ITOP signal and the BD signal is represented by a1>(⅔)T), so that the discrimination circuit 1611 shown in FIG. 18 provides an H-level output. Since the output of the discrimination circuit 1611 retains the phase data of the first rotation by the holding control signal from the CPU 130 shown in FIG. 17, it is maintained at the H-level unless the data of the first rotation is latched again. Thus, if the output of the comparator 1609, supplied to the other input of the comparator 1610, is at the H-level or L-level, the count number changing signal respectively assumes the H- or L-level.

With regard to the input phase A1 of the ITOP signal of the first rotation and that Am of the ITOP signal of the n-th rotation, since the phase differences 11, am of the ITOP signal and the BD signal satisfy relations a1>(½)T and am>(½)T, the comparator 1609 provides an H-level output while the count number changing signal assumes the L-level so that the selectors 1504, 1505 shown in FIG. 20 respectively select "n" and "m". Thus the count numbers are not changed and the counting operation is started at the timing (1).

With regard to the input phase An of the ITOP signal of the n-th rotation, since the phase differences an of the ITOP signal and the BD signal satisfies a relation an<(½)T, the count number changing signal assumes the H-level so that the selectors 1504, 1505 shown in FIG. 20 respectively select "n−1 and "m−1". Thus the n counting operation is started from an immediately preceding BD signal with a count decreased by one, so that the counting operation is started at a timing (1).

Thus, by starting the counting operation from the BD signal closest to the input of the ITOP signal, the fluctuation in the image writing start position can be suppressed to the phase difference between the ITOP signal and the BD signal.

As described in the foregoing, it is rendered possible to correct the color aberration of a line, resulting from a small aberration less than a line caused by the fluctuation in the rotation of the drum motor 115 or the backlash of the driving gears, by detecting the generating position of the ITOP signal within the period of the BD signal, and, in case the ITOP signal may be generated across the BD signal, controlling the count of the sub scanning line counter so as to start the counting operation from the BD signal closest to the input of the ITOP signal.

In the following there will be explained, with reference to a flow chart shown in FIG. 22, the image writing starting adjustment procedure in the image forming apparatus of the present invention.

FIG. 22 is a flow chart showing the image writing starting adjustment sequence in the image forming apparatus of the present invention, wherein (11) to (18) indicate process steps.

When the image forming sequence is started, the latch circuit 1605 detects, by the latch control signal from the CPU 130, the phase difference between the ITOP signal and the BD signal in the first rotation (11) and retains the detected phase difference (12).

The latch circuit 1603 detects the phase difference between the ITOP signal and the BD signal in the n-th rotation (13). In the first rotation (n=1), the latch circuit 1603 detects the phase difference between the ITOP signal and the BD signal in the first rotation, simultaneously with the detection by the latch circuit 1605 of the phase difference between the ITOP signal and the BD signal in the first rotation in the step (11).

Then the discrimination circuit 1611 discriminates whether the phase difference between the ITOP signal and the BD signal in the first rotation is within a predetermined range (larger than ⅓ but smaller than ⅔ of the period T of the BD signal) (14), and if it is within the predetermined range, the sequence proceeds to a step (16). If it is outside the predetermined range, the comparator 1609 discriminates whether the phase difference between the ITOP signal and the BD signal in the n-th rotation is less than ½ of the period T of the BD signal (15), and, if not, the sequence proceeds to a step (16).

In a step (16), the selectors 1504, 1505 in the image writing timing control circuit 101 set a count number "n", and the comparators 1506, 1507 and the JKFF 1508 emit the sub scanning image output start signal after "n" count of the BD signal, thereby starting the image formation.

On the other hand, if the step (15) identifies that the phase difference between the ITOP signal and the BD signal in the n-th rotation is less than ½ of the period T of the BD signal, the selectors 1504, 1505 of the image writing timing control circuit 101 set a count number "n−1" in a step (17), and the comparators 1506, 1507 and the JKFF 1508 emit the sub scanning image output start signal after "n−1" count of the BD signal, thereby starting the image formation (17).

Then there is discriminated whether the image forming sequence has been completed (18), and, if not, the sequence returns to the step (14) for detecting the phase difference of the ITOP signal and the BD signal in a next rotation, but, if completed, the sequence is terminated.

It is thus rendered possible to match the writing start position of each color with that of the first color without aberration in the timing of the sub scanning start signal, thereby obtaining an image of high quality without color aberration, by detecting the phase difference between the ITOP signal and the BD signal, then discriminating whether the ITOP signal of the second or subsequent rotation (second or subsequent color) may be generated across the BD signal according to whether a reference phase difference, for example the phase difference in the first rotation is within a predetermined range, and, if such ITOP signal may be generated across the BD signal, adjusting the count of the sub scanning line counter in such a manner as to start the counting operation thereof from the BD signal close to the ITOP signal.

The present embodiment has been explained by a case where the control corresponding to the above-described flow chart is realized by a hardware, but such control may naturally be realized by a software.

Seventh Embodiment

In the foregoing sixth embodiment, it is assumed that the fluctuation in the rotational phase of the photosensitive drum motor 115 and the scanner motor 106, caused for example by a variation in the load or by the backlash of the driving gears, is within ⅓ of the period of the BD signal. However, in case the fluctuation in the rotational phase of the photosensitive drum motor 115 and the scanner motor 106 is within 1/n of the period of the BD signal, the data set in B of the comparators 1606, 1607 shown in FIG. 18 may be selected as (1/n)T, ((n−1)/n)T.

Thus the present invention is likewise applicable, with effects similar to those in the sixth embodiment, to a case where the fluctuation in the rotational phase of the photosensitive drum motor 115 and the scanner motor 106, resulting for example from the fluctuation in the load or from the backlash in the driving gears, is less than ⅓ of the period of the BD signal.

Eighth Embodiment

In the foregoing sixth embodiment, there has been explained a configuration where the main scanning start signal (BD signal) is subjected to frequency division to obtain the reference clock signal for the photosensitive drum motor 115 for driving the photosensitive drum 105, the transfer drum 108 and the intermediate transfer member, and the number of the main scanning start signal (BD signal) generated during a rotation of the photosensitive drum 105 or the transfer drum 108 and that of the main scanning line signal synchronized therewith become an integer. It is however possible also to synchronize the photosensitive drum 105, the transfer drum 108 and the intermediate transfer member with the scanner motor 106 by employing a common clock signal for the reference clock signal for the photosensitive drum motor 115 for driving the photosensitive drum 105, the transfer drum 108 and the intermediate transfer member and for the reference clock signal for the scanner motor 106 for controlling the main scanning operation.

The present invention may be applied in this manner to obtain effects similar to those in the sixth embodiment.

Ninth Embodiment

In the foregoing sixth embodiment, there has been explained a configuration where the main scanning start signal(BD signal) is subjected to frequency division to obtain the reference clock signal for the photosensitive drum motor 115 for driving the photosensitive drum 105, the transfer drum 108 and the intermediate transfer member, and the number of the main scanning start signal (BD signal) generated during a rotation of the photosensitive drum 105 or the transfer drum 108 and that of the main scanning line signal synchronized therewith become an integer. It is however possible also to synchronize the photosensitive drum 105, the transfer drum 108 and the intermediate transfer member with the scanner motor 106 by matching, at each generation of the sub scanning start signal (ITOP signal), the phase of the main scanning start signal (BD signal) with that of the sub scanning start signal.

The present invention may be applied in this manner to obtain effects similar to those in the sixth embodiment.

Tenth Embodiment

In the foregoing sixth embodiment, there has been explained a configuration of controlling the count of the generating position of the ITOP signal based on the phase difference of the ITOP signal detected by the phase difference detection circuit 122, in the image forming apparatus in which a sub scanning start signal (ITOP signal) is generated for a rotation of the photosensitive drum 105, the transfer drum 108 or the intermediate transfer member. It is however also possible, in an image forming apparatus capable of generating plural sub scanning start signals (ITOP signals) for a rotation of the photosensitive drum 105 and of executing formation of plural latent images and transfer of plural images in a rotation thereof, that the phase difference detection circuit 122 are provided independently for the respectively ITOP signals the image writing timing control circuit 101 controls the count indicating the generating position of the ITOP signal based on the phase difference detected for each ITOP signal.

Thus, even in case forming plural latent images and transferring plural images in a rotation of the photosensitive drum, it is rendered possible to exactly match the writing start position of the images from the first color to the N-th color, thereby obtaining an image of high quality without color aberration.

Eleventh Embodiment

In the foregoing sixth embodiment, there has been explained the configuration in which the latch circuit 605 detects the phase difference between the ITOP signal and the BD signal in the first rotation (first color) by the latch control signal from the CPU 130 shown in FIG. 2. However, in case of forming plural multi-color images in a single image forming sequence, there may be adopted a configuration in which the latch circuit 605 detects the phase difference between the ITOP signal and the BD signal in the first rotation (first color) in each image based on the latch control signal from the CPU 130.

In this manner the present invention may be applied to obtain effects similar to those in the sixth embodiment.

Also in the sixth embodiment, the sub scanning start signal (ITOP signal) is generated by the ITOP sensor 110 by detecting the flag 111 fixed in the transfer drum, but there may be provided a timer unit for measuring the period of the photosensitive drum or the transfer drum and the sub scanning start signal (ITOP signal) may be generated according to the time measurement by such timer unit.

As explained in the foregoing, it is rendered possible to match the writing start position for each color with that of the first color on the sheet, without aberration in the timing of the sub scanning start signal, thereby obtaining an image of high quality without color aberration, by detecting the generating position of the ITOP signal within the period of the BD signal, detecting the phase difference from a reference generating position such as the generating position of the ITOP signal for the first color and accordingly adjusting the count of the sub scanning line counter.

As described in the foregoing, the present invention allows to match, on the recording sheet, the writing start position of the image in each color with that of the image of the first color without aberration in the timing of the sub scanning start signal, even in case the mechanical configuration for avoiding the positional aberration is incapable of preventing the fluctuation in the relative timing of generation of the sub scanning start signal and the main scanning start signal from the theoretical value, for example in case the rotation speed of the photosensitive member etc. fluctuates by the influence of the variation in the load or the backlash in the driving gears, thereby obtaining an image of high quality without color aberration, by detecting the generating position of the ITOP signal within the period of the BD signal, discriminating whether the ITOP signal in the second or subsequent rotation (second or subsequent color) may be generated across the BD signal with respect to a reference generating position for example that of the ITOP signal of the first rotation (first color), and, in case such generation across the BD signal is possible, controlling the count of the sub scanning line counter in starting the counting operation thereof from the BD signal positioned close to the ITOP signal.

The objects of the present invention can naturally be attained also in a case where a memory medium storing the program codes of a software realizing the functions of the aforementioned embodiments is supplied to a system or an apparatus and the functions of the aforementioned embodiments are realized by a computer (CPU or MPU) of the above-mentioned system or apparatus by reading and executing the program codes stored in the memory medium.

In such case the program codes themselves of the software realize the novel functions of the present invention, and the memory medium storing the program codes constitutes the present invention.

The memory medium storing such program codes can be, for example, a floppy disk, a hard disk, an optical disk, a magnetooptical disk, a CD-ROM, a CR-R, a magnetic tape, a non-volatile memory card, a ROM or an EEPROM.

The present invention also includes not only a case where the functions of the aforementioned embodiments are realized by the execution of the program codes read by the computer but also a case where an operating system or the like functioning on the computer executes all or a part of the actual processes under the control of such program codes thereby realizing the functions of the foregoing embodiments.

The present invention further includes a case wherein the program codes read from the memory medium are once stored in a function expansion board inserted into the computer or a function expansion unit connected to the computer, and a CPU provided in the function expansion board or the function expansion unit executes all the process or a part thereof under the control of such program codes, thereby realizing the functions of the aforementioned embodiments.

Also, the present invention may be applied to a system consisting of plural equipment or an apparatus consisting of a single equipment. Further, the present invention is naturally applicable to a case where the present invention is attained by supplying a system or an apparatus with a program. In such case, such system or apparatus can enjoy the effects of the present invention, by reading a program representing the software for attaining the present invention from a memory medium storing such program.

Furthermore, a system or an apparatus can enjoy the effects of the present invention by downloading a program representing the software for attaining the present invention from a data base on a network, through a communication program.

As described in the foregoing, the present invention to prevent generation of color aberration of a line or larger by counting the BD signal based on the phase difference between the ITOP signal and the BD signal for the first color, even in case the ITOP signal of a subsequent color is generated across the corresponding BD signal.

The present invention is not limited to the foregoing embodiments but is subject to various modifications and alterations within the scope and spirit of the appended claims.

What is claimed is:

1. An image forming apparatus for forming a multi-color image by superposing in succession color component images formed according to the image information of respective color components, comprising:
   a rotary polygonal mirror for deflecting a light beam based on the image information of each of said color components thereby scanning a rotated image bearing member;
   main scanning start signal generation means for generating a main scanning start signal by detecting the light beam put in a scanning motion by said rotary polygonal mirror;
   sub scanning start signal generation means for generating a sub scanning start signal in synchronization with the rotation of said image bearing member;
   control means for controlling an output start of the image information of each of said color components in synchronization with generation of the main scanning start signals of a predetermined number, after generation of the sub scanning start signal;
   detection means for detecting a phase difference between the sub scanning start signal and the main scanning start signal at formation of each color component image; and
   comparison means for comparing the phase difference between the sub scanning start signal and the main scanning start signal at the formation of a first color image detected by said detection means, with the phase difference between the sub scanning start signal and the main scanning start signal at the formation of an n-th color image detected by said detection means,
   wherein said control means changes said predetermined number according to the compared result of said comparison means.

2. An image forming apparatus according to claim 1, wherein:
   said comparison means compares the difference between the phase difference at the formation of the first color image and the phase difference at the formation of the n-th color image with a predetermined amount; and
   said control means changes said predetermined number when the comparison by said comparator means indicates that the the difference between the two phase differences is larger than said predetermined amount.

3. An image forming apparatus according to claim 2, wherein said control means increases said predetermined number when the difference between the two phase differences is larger than said predetermined amount and the phase difference at the formation of the first color image is smaller than the phase difference at the formation of the n-th color image.

4. An image forming apparatus according to claim 2, wherein said control means decreases said predetermined number when the difference between the two phase differences is larger than said predetermined amount and the phase difference at the formation of the first color image is larger than the phase difference at the formation of the n-th color image.

5. An image forming apparatus according to claim 1, wherein:
   said sub scanning start signal generation means is adapted to generate plural sub scanning start signals within a rotation of said image bearing member in synchronization with the rotation thereof;
   comparison means is provided for each of the sub scanning start signals generated by said sub scanning start signal generation means within a rotation of said image bearing member, and is adapted to detect and retain the phase difference between the sub scanning start signal and the main scanning start signal at formation of a first color image, to detect the phase difference between the sub scanning start signal and the main scanning start signal at formation of the n-th color image and to compare the phase difference detected at said predetermined timing with the phase difference detected at each formation of the color component image; and
   said control means is adapted, based on the results of comparisons by said comparison means, to respectively control an output start of image information for each sub scanning start signal.

6. An image forming apparatus according to claim 1, wherein said image information of respective color components is read from an original.

7. An image forming apparatus according to claim 1, wherein said image information of respective color components is entered from an information processing apparatus through a predetermined communication medium.

8. A control method for an image forming apparatus for forming a multi-color image by superposing in succession color component images formed according to the image information of respective color components, the method comprising:
   a first detection step of detecting, at formation of a first color image, the phase difference between a sub scanning start signal generated in synchronization with the rotation of an image bearing member and a main scanning start signal generated by detecting a light beam put into scanning motion by a rotary polygonal mirror;
   a retaining step of retaining said detected phase difference;
   a second detecting step of detecting the phase difference between said sub scanning start signal and said main scanning start signal at formation of the n-th color image;
   a comparison step of comparing the phase difference detected at formation of a first color image and retained in said retaining step with the phase difference detected at the formation of the n-th color image in said second detection step; and
   an image formation step of effecting image formation by counting the main scanning start signal of a number based on the result of said comparison, after the generation of said sub scanning start signal.

9. An image forming apparatus for forming a multi-color image by superposing in succession color component images formed according to the image information of respective color components, comprising:
   a rotary polygonal mirror for deflecting a light beam based on the image information of each of said color components thereby scanning a rotated image bearing member;
   main scanning start signal generation means for generating a main scanning start signal by detecting the light beam put in a scanning motion by said rotary polygonal mirror;
   sub scanning start signal generation means for generating a sub scanning start signal in synchronization with the rotation of said image bearing member;
   control means for controlling an output start of the image information of each of said color components in accordance with counting of the main scanning start signals to a predetermined number, after generation of the sub scanning start signal;

first discrimination means for detecting and retaining the phase difference between the sub scanning start signal and the main scanning start signal at formation of a first color image, and discriminating whether the phase difference detected is within a first range; and second discrimination means for detecting the phase difference between the sub scanning start signal and the main scanning start signal at formation of an n-th color image, and discriminating whether the phase difference detected at each formation of the color component image is within a second range, wherein said control means changes the count number of the main scanning start signals until the output start of the image information, on the basis of the discriminated results of said first discrimination means and said second discrimination means.

10. An image forming apparatus according to claim 9, wherein said control means is adapted, in case said first discrimination means identifies that the phase difference detected at formation of the first color image is not within the first range, to change said count number from a predetermined number according to the result of discrimination by said second discrimination means, and not to change said count number in case said first discrimination means identifies that the phase difference detected at formation of the n-th color image is within the first range.

11. An image forming apparatus according to claim 10, wherein said control means is adapted to change and increase said count number from the predetermined number in case said first discrimination means identifies that the phase difference detected at formation of the first color image is not within the first range and the second discrimination means identifies that the phase difference detected at formation of the n-th color image is within the second range.

12. An image forming apparatus according to claim 10, wherein said control means is adapted not to change said count number in case said first discrimination means identifies that the phase difference detected at formation of the first color image is not within the first range and said second discrimination means identifies that the phase difference detected at formation of the n-th color image is not within the second range.

13. An image forming apparatus according to claim 9, wherein said first range is a predetermined range in the period of said main scanning start signal.

14. An image forming apparatus according to claim 9, wherein said first range is a predetermined range in the period of said main scanning start signal, having the center at ½ of the period of said main scanning start signal.

15. An image forming apparatus according to claim 9, wherein said second range is a predetermined range in the period of said main scanning start signal.

16. An image forming apparatus according to claim 9, wherein said second range is a predetermined less than ½ of the period of said main scanning start signal.

17. An image forming apparatus according to claim 9, wherein:

said sub scanning start signal generation means is adapted to generate plural sub scanning start signals within a rotation of said image bearing member in synchronization with the rotation thereof;

there are provided first discrimination means adapted to detect and retain the phase difference between the sub scanning start signal and the main scanning start signal at formation of a first color image, for each of the sub scanning start signals generated by said sub scanning start signal generation means within a rotation of said image bearing member, and to discriminate whether the phase difference detected at formation of the first color image is within the first range, and second discrimination means adapted to detect the phase difference between the sub scanning start signal and the main scanning start signal at formation of the n-th color image, for each of the sub scanning start signals generated by said sub scanning start signal generation means within a rotation of said image bearing member, and to discriminate whether the phase difference detected at formation of the n-th color image is within the second range; and said control means is adapted, based on the results of discriminations by said first and second discrimination means, to respectively control the start timing of image formation for each sub scanning start signal.

18. An image forming apparatus according to claim 9, wherein said image information of respective color components is read from an original.

19. An image forming apparatus according to claim 9, wherein said image information of respective color components is entered from an information processing apparatus through a predetermined communication medium.

20. A control method for an image forming apparatus for forming a multi-color image by superposing in succession color component images formed according to the image information of respective color components, the method comprising:

a first detection step of detecting, at formation of a first color image, the phase difference between a sub scanning start signal generated in synchronization with the rotation of an image bearing member and a main scanning start signal generated by detecting a light beam put into scanning motion by a rotary polygonal mirror;

a retaining step of retaining said detected phase difference;

a first discrimination step of discriminating whether said retained phase difference detected at formation of the first color image is within a first range;

a second detection step of detecting the phase difference between said sub scanning start signal and said main scanning start signal at formation of the n-th color image;

a second discrimination step of discriminating whether the phase difference detected at each formation of the color component image is within a second range; and an image formation step of effecting image formation by counting, after the generation of said sub scanning start signal, the main scanning start signal of a number based on the results of discrimination by said first and second discrimination steps.

* * * * *

UNITED STATES PATENT AND TRADEMARK OFFICE
CERTIFICATE OF CORRECTION

PATENT NO. : 6,275,281 B1
DATED : August 14, 2001
INVENTOR(S) : Tetsuya Nozaki

It is certified that error appears in the above-identified patent and that said Letters Patent is hereby corrected as shown below:

Column 10,
Line 5, "detects" should read -- detect --;
Line 21, "fixed" should read -- fixes --; and
Line 38, "scanning0the" should read -- scanning the -- and "th" should read -- the --.

Column 12,
Line 42, "a" should read -- an --.

Column 14,
Line 22, "than" should read -- then --.

Column 15,
Line 55, "such" should read -- such a --.

Column 16,
Line 60, "then" should read -- than --.

Column 17,
Line 1, "then" should read -- than --; and
Line 27, "signal" should read -- signals --.

Column 18,
Line 63, "compares" should read -- compare --.

Column 19,
Line 23, "formation" should read -- formation (7) --; and
Line 59, "it" should read -- is --.

Column 21,
Line 3, "case" should read -- case of --.

UNITED STATES PATENT AND TRADEMARK OFFICE
CERTIFICATE OF CORRECTION

PATENT NO. : 6,275,281 B1
DATED : August 14, 2001
INVENTOR(S) : Tetsuya Nozaki

It is certified that error appears in the above-identified patent and that said Letters Patent is hereby corrected as shown below:

<u>Column 26,</u>
Line 19, "he" should read -- the --; and
Line 55, "following" should read -- following, --.

Signed and Sealed this

Ninth Day of April, 2002

Attest:

Attesting Officer

JAMES E. ROGAN
Director of the United States Patent and Trademark Office